US011088386B2

(12) United States Patent
Mizutani et al.

(10) Patent No.: US 11,088,386 B2
(45) Date of Patent: Aug. 10, 2021

(54) FUEL CELL MONITORING DEVICE AND METHOD OF DETERMINING STATE OF FUEL CELL

(71) Applicant: TOYOTA JIDOSHA KABUSHIKI KAISHA, Toyota (JP)

(72) Inventors: Chiaki Mizutani, Nisshin (JP); Ikuyasu Kato, Obu (JP); Miho Hatazaki, Nisshin (JP); Kazuo Yamamoto, Toyota (JP); Shigeki Hasegawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 69 days.

(21) Appl. No.: 16/663,467

(22) Filed: Oct. 25, 2019

(65) Prior Publication Data
US 2020/0168939 A1 May 28, 2020

(30) Foreign Application Priority Data
Nov. 28, 2018 (JP) .............................. JP2018-221810

(51) Int. Cl.
H01M 8/249 (2016.01)
H01M 8/04089 (2016.01)
H01M 8/04746 (2016.01)
H01M 8/04537 (2016.01)

(52) U.S. Cl.
CPC ....... *H01M 8/249* (2013.01); *H01M 8/04089* (2013.01); *H01M 8/04589* (2013.01); *H01M 8/04753* (2013.01); *H01M 8/04768* (2013.01)

(58) Field of Classification Search
CPC ............. H01M 8/249; H01M 8/04089; H01M 8/04589; H01M 8/04753
See application file for complete search history.

(56) References Cited

U.S. PATENT DOCUMENTS

| 2009/0169934 A1 | 7/2009 | Manabe et al. |
| 2014/0295302 A1 | 10/2014 | Ishikawa et al. |
| 2017/0059663 A1 | 3/2017 | Ishikawa et al. |

(Continued)

FOREIGN PATENT DOCUMENTS

| EP | 1501146 A2 * | 1/2005 |
| JP | 2006-318669 A | 11/2006 |
| JP | 2007-012419 A | 1/2007 |

(Continued)

*Primary Examiner* — Olatunji A Godo
(74) *Attorney, Agent, or Firm* — Dickinson Wright, PLLC

(57) ABSTRACT

A fuel cell monitoring device includes: an impedance measuring part measuring an impedance at each fuel cell and an impedance at a fuel cell stack as a whole; a water content estimating part calculating a water content estimated value at each fuel cell using a gas diffusion resistance obtained from a measurement result about the impedance at each fuel cell, and calculating a water content reference estimated value indicating a water content in each fuel cell using a gas diffusion resistance obtained from a measurement result about the impedance at the fuel cell stack as a whole; and a determining part detecting at least either the occurrence of deterioration of catalyst in the fuel cell or the occurrence of a distribution failure of reactive gas at the fuel cell by determining based on the magnitude of the water content estimated value relative to the water content reference estimated value.

7 Claims, 23 Drawing Sheets

(56) References Cited

U.S. PATENT DOCUMENTS

2017/0294667 A1    10/2017  Hasegawa
2018/0294494 A1*   10/2018  Mizutani ........... H01M 8/04492

FOREIGN PATENT DOCUMENTS

| JP | 2014-203562 A | 10/2014 |
| JP | 2015-099727 A | 5/2015 |
| JP | 2017-045648 A | 3/2017 |
| JP | 2017-084453 A | 5/2017 |
| JP | 2017-188358 A | 10/2017 |

* cited by examiner

FUEL CELL MONITORING DEVICE AND METHOD OF DETERMINING STATE OF FUEL CELL

CROSS REFERENCE TO RELATED APPLICATIONS

The present application claims priority based on Japanese Patent Application No. 2018-221810 filed on Nov. 28, 2018, and the disclosure of which is hereby incorporated by reference herein in its entirety.

BACKGROUND

Field

This disclosure relates to a fuel cell monitoring device and a method of determining the state of a fuel cell.

Related Art

As an example, JP2006-318669A discloses a fuel cell monitoring device that measures an impedance at a fuel cell according to the AC impedance method, and detects a failure at the fuel cell using a result of the measurement. An impedance at a fuel cell is a parameter having correlations with various types of factors. Hence, in some cases, simply comparing a measured impedance value with a predetermined threshold makes it impossible to correctly identify a factor for a defect occurring at a fuel cell. A technique of detecting a failure occurring at a fuel cell using a measured impedance value is still susceptible to improvement.

SUMMARY

According to one aspect of this disclosure, there is provided as a fuel cell monitoring device that monitors the state of a fuel cell stack including multiple stacked fuel cells. The fuel cell monitoring device of this aspect includes: an impedance measuring part configured to apply an AC signal to the fuel cell stack, detect a voltage at each of the fuel cells, a voltage at the fuel cell stack as a whole and an output current from the fuel cell stack, and measure an impedance at each of the fuel cells and an impedance at the fuel cell stack as a whole; a water content estimating part configured to obtain a gas diffusion resistance at each of the fuel cells having a correlation with a water content in each of the fuel cells using a measurement result about the impedance at each of the fuel cells, calculate a water content estimated value as an estimated value of a water content in each of the fuel cells using the gas diffusion resistance at each of the fuel cells, obtain a gas diffusion resistance at the fuel cell stack having a correlation with a water content in the fuel cell stack using a measurement result about the impedance at the fuel cell stack as a whole, and calculate a water content reference estimated value indicating a water content in each of the fuel cells using the gas diffusion resistance at the fuel cell stack; and a determining part configured to detect at least either the occurrence of deterioration of catalyst in the fuel cells or the occurrence of a distribution failure of reactive gas at the fuel cells by determining based on the magnitude of the water content estimated value relative to the water content reference estimated value.

DETAILED DESCRIPTION

1. First Embodiment 1-1. Outline of Fuel Cell System

Figure 1:
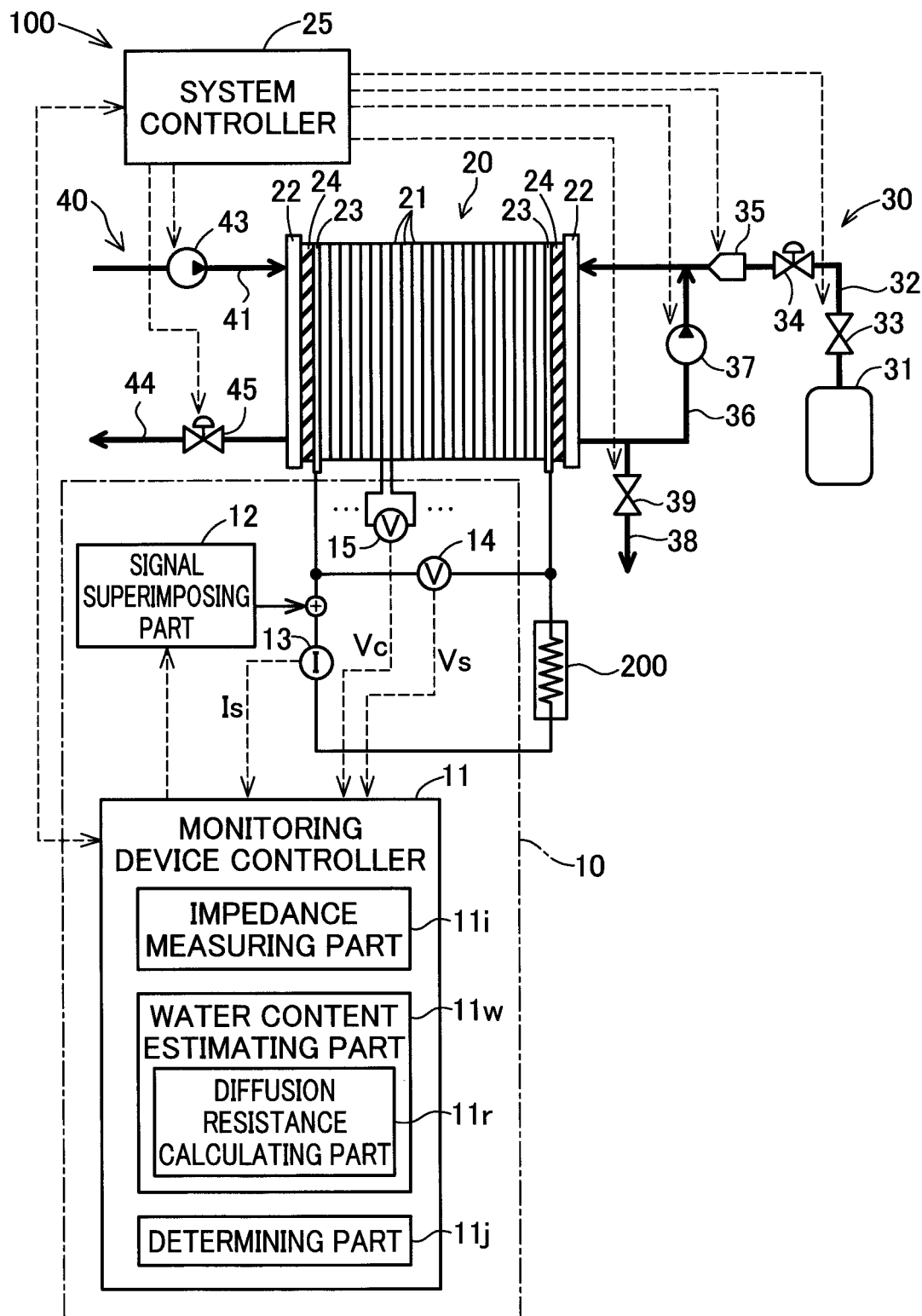
FIG. 1 is a schematic view showing a fuel cell system including a fuel cell monitoring device of a first embodiment.

FIG. 1 is a schematic view showing a fuel cell system 100 including a fuel cell monitoring device 10 of a first embodiment. The fuel cell system 100 includes a fuel cell stack 20 that generates power in response to supply of fuel gas and oxidizing gas as reactive gases, and makes the fuel cell stack 20 generate power responsive to a request from an external load 200. The fuel cell monitoring device 10 monitors the fuel cell stack 20 while the fuel cell stack 20 generates power, and detects a defect occurring at the fuel cell stack 20. In the following description, the configuration of the fuel cell system 100 except the fuel cell monitoring device 10 will be described first, and then the fuel cell monitoring device 10 will be described.

In the first embodiment, the fuel cell system 100 is mounted on a fuel cell vehicle, and outputs power to be used for running of the fuel cell vehicle or to be consumed by auxiliary machines or electrical components in the fuel cell vehicle. The power output from the fuel cell system 100 may be supplied externally. In other embodiments, the fuel cell system 100 may not be mounted on a fuel cell vehicle. The fuel cell system 100 may be mounted on a mobile body such as a ship or may fixedly be placed in an installation such as a building, for example.

1-2. Configuration of Fuel Cell Stack

The fuel cell stack 20 is a polymer electrolyte fuel cell and generates power using electrochemical reaction between hydrogen as fuel gas and oxygen as oxidizing gas. The fuel cell stack 20 has a stacked structure with multiple stacked fuel cells 21. Each of the fuel cells 21 is a power generator capable of generating power alone. The fuel cell stack 20 is provided with a manifold not shown in the drawings as a branched flow path for reactive gas and a refrigerant connected to each of the fuel cells 21.

Figure 2:
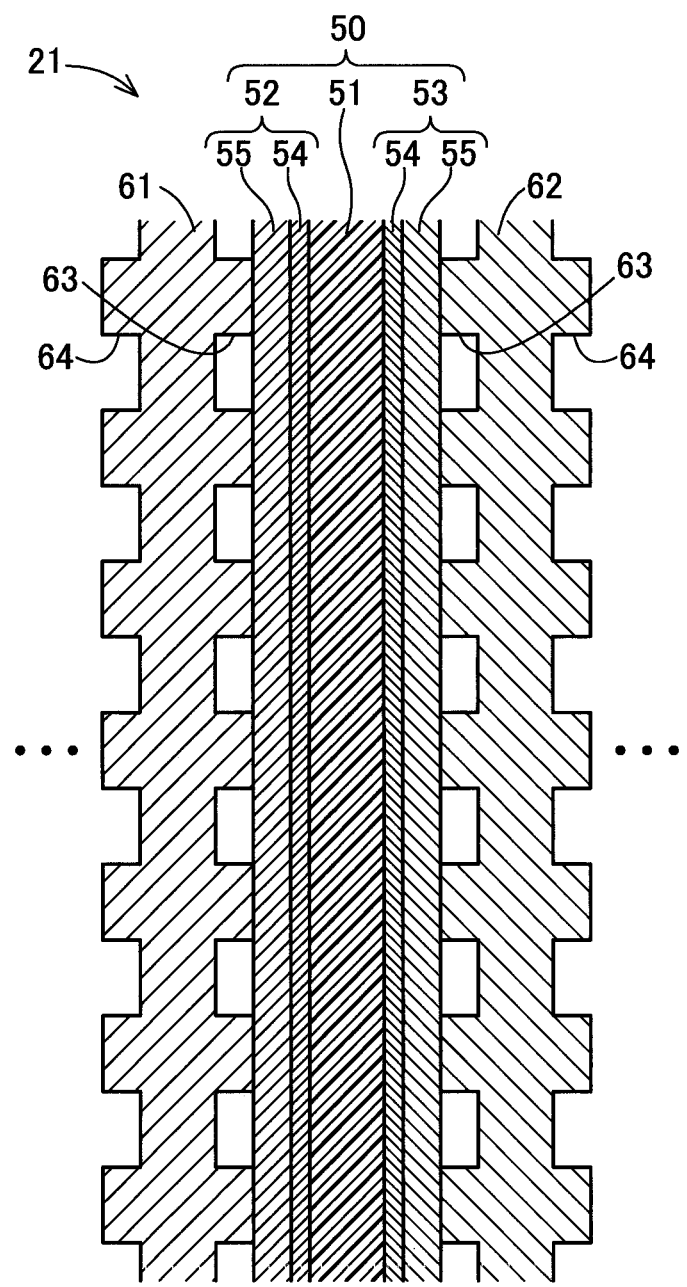
FIG. 2 is a schematic sectional view showing the configuration of a fuel cell.

FIG. 2 is a schematic sectional view showing the configuration of the fuel cell 21. The fuel cell 21 includes a membrane electrode assembly 50 as a power generator. The membrane electrode assembly 50 includes an electrolyte membrane 51, and two electrodes 52 and 53. The electrolyte membrane 51 is a membrane made of electrolyte resin that fulfills favorable proton conductivity in a wet condition. The electrolyte membrane 51 is made of fluorine-based ion-exchange resin, for example. The first electrode 52 and the second electrode 53 are arranged on opposite sides of the electrolyte membrane 51. The first electrode 52 is an anode to which the fuel gas is supplied. The second electrode 53 is a cathode to which the oxidizing gas is supplied. Each of the electrodes 52 and 53 includes a catalyst layer 54 arranged on a surface of the electrolyte membrane 51, and a gas diffusion layer 55 stacked on the catalyst layer 54. The catalyst layer 54 contains a catalyst for accelerating power generating reaction, and conductive particles supporting the catalyst. Platinum (Pt) may be used as the catalyst, for example. Carbon particles may be used as the conductive particles, for example. The gas diffusion layer 55 is made of a porous base having gas diffusion properties and conductivity. The gas diffusion layer 55 may be made of carbon paper, for example.

The fuel cell 21 includes two separators 61 and 62 between which the membrane electrode assembly 50 is sandwiched. The first separator 61 faces the first electrode 52, and the second separator 62 faces the second electrode 53. Each of the separators 61 and 62 is made of a plate-like member having conductivity and gas impermeability such as a metal plate, for example. A surface of each of the separators 61 and 62 adjacent to the membrane electrode assembly 50 is provided with grooves forming a gas flow path 63 for guiding the reactive gas. The gas flow path 63 in each fuel cell 21 is connected to the manifold not shown in the drawings. The gas flow path 63 at the first separator 61 is for flow of the fuel gas. The gas flow path 63 at the second separator 62 is for flow of the oxidizing gas. A surface of each of the separators 61 and 62 on the opposite side of the surface with the gas flow path 63 is provided a refrigerant flow path 64 for flow of the refrigerant.

Referring to FIG. 1, the fuel cell stack 20 includes end plates 22 provided at opposite ends viewed in a direction in which the fuel cells 21 are stacked. Each of the end plates 22 is made of a metal plate, for example. The stack of the fuel cells 21 is fastened via the end plates 22 with a fastening member not shown in the drawings. The end plates 22 are provided with connections for connections to a pipe 32, a pipe 36, a pipe 41, and a pipe 44 described later for passage of the reactive gases.

A current collecting plate 23 and an insulating plate 24 are arranged between each of the end plates 22 and the stack of the fuel cells 21. The current collecting plate 23 is made of a plate-like member having conductivity. The current collecting plate 23 is in contact with the stack of the fuel cells 21 and electrically conductive with each fuel cell 21. The current collecting plate 23 functions as a terminal. The fuel cell stack 20 is electrically connected to the external load 200 including a motor, auxiliary machines, and electrical components via the current collecting plate 23. The insulating plate 24 is arranged between the current collecting plate 23 and the end plate 22 and electrically insulates the current collecting plate 23 and the end plate 22 from each other.

1-3. Structure for Power Generation by Fuel Cell Stack

The fuel cell system 100 further includes a system controller 25 that controls running of the fuel cell stack 20, and a fuel gas supply and discharge unit 30 and an oxidizing gas supply and discharge unit 40 for supply and discharge of the reactive gases to and from the fuel cell stack 20. The fuel cell system 100 further includes a refrigerant supply unit for supply of the refrigerant to the refrigerant flow path 64 in the fuel cell stack 20, a converter for control of an output current, a secondary cell, and the like. The detailed description of these units in the specification and illustration of these units in the drawings will be omitted for the sake of convenience.

The system controller 25 is configured using an electronic control unit, which is also called ECU, including at least one processor and a main storage. The system controller 25 executes a program or an instruction read by the processor into the main storage to fulfill various functions for controlling power generation by the fuel cell stack 20. At least some of the functions of the system controller 25 may be achieved by a hardware circuit. The system controller 25 further functions as a higher-order controller for the fuel cell monitoring device 10. The system controller 25 may use parameters described later measured by the fuel cell monitoring device 10 such as an output current, a stack voltage Vs, a cell voltage Vc, and a water content estimated value Wc at the fuel cell stack 20 for controlling running of the fuel cell stack 20.

As a fuel gas supply system, the fuel gas supply and discharge unit 30 includes a high-pressure tank 31, a supply pipe 32, an on-off valve 33, a regulator 34, and an injector 35. The high-pressure tank 31 stores the fuel gas in a high-pressure state. The supply pipe 32 connects the high-pressure tank 31 to an anode-side manifold inlet of the fuel cell stack 20 provided to the end plate 22 to guide the fuel gas in the high-pressure tank 31 to the fuel cell stack 20. The on-off valve 33, the regulator 34, and the injector 35 are provided to the supply pipe 32. The system controller 25 controls opening and closing of the on-off valve 33 to control flow of the fuel gas from the high-pressure tank 31 into the supply pipe 32. The regulator 34 regulates pressure upstream of the injector 35. The injector 35 injects the fuel gas toward the anode of the fuel cell stack 20 under control of the system controller 25.

As a fuel gas discharge and circulation system, the fuel gas supply and discharge unit 30 further includes a circulation pipe 36, a circulation pump 37, a drain pipe 38, and a drain valve 39. The circulation pipe 36 is connected to an anode-side manifold outlet of the fuel cell stack 20 provided to the end plate 22. The circulation pump 37 is provided to the circulation pipe 36. Anode discharge gas discharged from the fuel cell stack 20 is fed by the circulation pump 37 to the supply pipe 32 via the circulation pipe 36. The drain pipe 38 is connected to the circulation pipe 36 via a gas-liquid separator not shown in the drawings. The drain pipe 38 is for discharge of wastewater as a liquid component resulting from separation from the anode discharge gas and accumulated in the gas-liquid separator to the outside of the fuel cell vehicle. The drain valve 39 is provided to the drain pipe 38. The system controller 25 controls opening and closing of the drain valve 39 to control discharge of the wastewater via the drain pipe 38.

As an oxidizing gas supply system, the oxidizing gas supply and discharge unit 40 includes a supply pipe 41 and a compressor 43. The supply pipe 41 has one end connected to a cathode-side manifold inlet of the fuel cell stack 20 provided to the end plate 22, and the opposite end connected to an air intake of the fuel cell vehicle not shown in the drawings. The compressor 43 is provided to the supply pipe 41. The compressor 43 takes in air containing oxygen as the oxidizing gas, compresses the air, and supplies the compressed air to the fuel cell stack 20 under control of the system controller 25.

As an oxidizing gas discharge system, the oxidizing gas supply and discharge unit 40 further includes a discharge pipe 44 and a back-pressure valve 45. The discharge pipe 44 is connected to a cathode-side manifold outlet of the fuel cell stack 20 provided to the end plate 22 to guide cathode discharge gas discharged from the fuel cell stack 20 to the outside of the fuel cell vehicle. The back-pressure valve 45 is provided to the discharge pipe 44. The system controller 25 controls a degree of opening of the back-pressure valve 45 to regulate back pressure in the fuel cell stack 20.

1-4. Configuration of Fuel Cell Monitoring Device

The fuel cell monitoring device 10 includes a monitoring device controller 11 that performs monitoring process of monitoring the state of the fuel cell stack 20 while controlling the fuel cell monitoring device 10 entirely. The monitoring device controller 11 is configured using a computer including at least one processor and a main storage. The monitoring device controller 11 may be configured as a part of the ECU forming the system controller 25. The monitoring device controller 11 executes a program or an instruction read by the processor into the main storage to fulfill various functions for performing the monitoring process.

The monitoring device controller 11 includes an impedance measuring part 11$i$, a water content estimating part 11$w$, and a determining part 11$j$ as functional parts for performing the monitoring process. The impedance measuring part 11$i$ measures an impedance at the fuel cell stack 20 according to the AC impedance method. The water content estimating part 11$w$ includes a diffusion resistance calculating part 11$r$ that calculates a gas diffusion resistance described later from a result of the measurement by the impedance measuring part 11$i$. The water content estimating part 11$w$ calculates a water content estimated value as an estimated value of a water content in the fuel cell 21 using the gas diffusion resistance calculated by the diffusion resistance calculating part 11$r$. The determining part 11$j$ detects the occurrence of a defect at the fuel cell 21 by making a determination using the water content estimated value calculated by the water content estimating part 11$w$. In the first embodiment, the determining part 11$j$ detects the occurrence of catalyst deterioration at each fuel cell 21. A method of calculating the water content estimated value and a method of making a determination using the water content estimated value will be described in detail later.

The fuel cell monitoring device 10 further includes a signal superimposing part 12, a current measuring part 13, a stack voltage measuring part 14, and a cell voltage measuring part 15 provided as hardware for monitoring the state of the fuel cell stack 20. The signal superimposing part 12 includes an AC power supply and superimposes an AC signal on an output current from the fuel cell stack 20 under control by the impedance measuring part 11$i$ of the monitoring device controller 11. The current measuring part 13 measures the output current from the fuel cell stack 20 and outputs the measured output current to the monitoring device controller 11. The stack voltage measuring part 14 measures a stack voltage indicating a voltage at the fuel cell stack 20 as a whole and outputs the measured stack voltage to the monitoring device controller 11. The cell voltage measuring part 15 measures a cell voltage indicating a voltage at each fuel cell 21 and outputs the measured cell voltage to the monitoring device controller 11.

1-5. Monitoring Process

Figure 3:
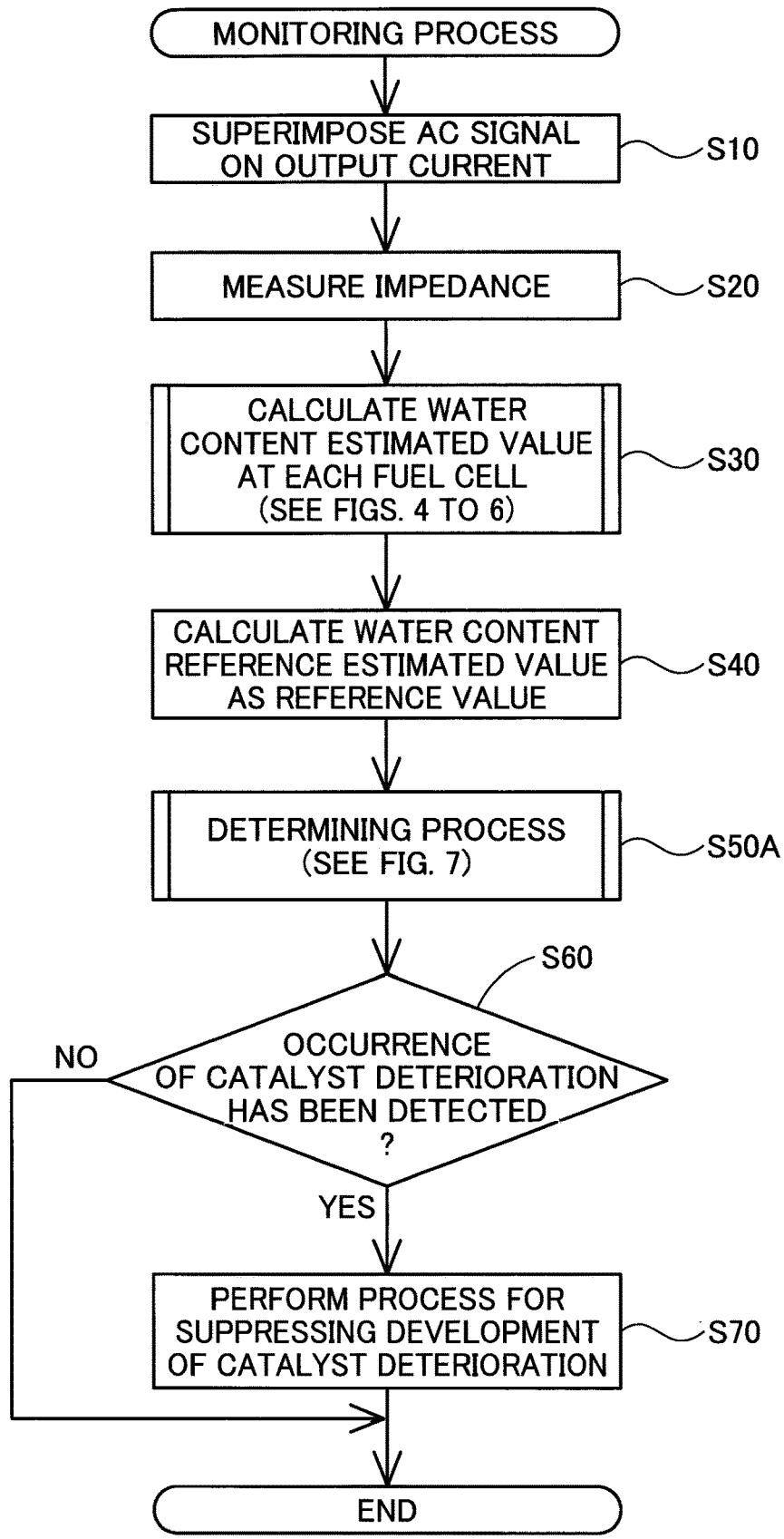
FIG. 3 is an explanatory view showing a flow of monitoring process of the first embodiment.

FIG. 3 is an explanatory view showing a flow of the monitoring process of the first embodiment. The fuel cell monitoring device 10 performs the monitoring process in a predetermined cycle while the fuel cell stack 20 generates power. The monitoring process of the first embodiment is to determine the presence or absence of catalyst deterioration at a fuel cell 21 predetermined as a determination target. The "catalyst deterioration" mentioned herein means deterioration that develops irreversibly at the catalyst layer 54 such as separation of the catalyst due to oxidation of carbon in the catalyst layer 54 or reduction in a reaction area due to aggregation of the catalyst. Such types of catalyst deterioration are likely to occur if power is generated continuously while there is a shortage of supply of the fuel gas to the fuel cells 21.

All the fuel cells 21 forming the fuel cell stack 20 are to be targets of determination by the monitoring process of the first embodiment. In other embodiments, any n fuel cells 21 may be selected in advance as determination targets from N fuel cells 21 forming the fuel cell stack 20. Here, N and n are natural numbers satisfying N>n. If only some of the fuel cells 21 are to be determination targets, these determination targets desirably include at least a fuel cell 21 at an end of the fuel cell stack 20 viewed in the stacking direction. The reason for this is that catalyst deterioration tends to occur at such a fuel cell 21 at the end.

In step S10, the impedance measuring part 11$i$ applies an AC signal to the fuel cell stack 20. In the first embodiment, the impedance measuring part 11$i$ makes the signal superimposing part 12 superimpose two AC signals of different frequencies on an output current from the fuel cell stack 20. The impedance measuring part 11$i$ may cause superimposition of the two AC signals of different frequencies simultaneously or alternately. The impedance measuring part 11$i$ causes superimposition of a signal of a sine wave alternating current responsive to the magnitude of a current output from the fuel cell stack 20. An effective value of the alternating current to be superimposed may be from about 5 to about 10% of the output current from the fuel cell stack 20, for example. Of the frequencies of the two AC signals superimposed by the signal superimposing part 12, the higher frequency is called a "high frequency $f_H$" and the lower frequency is called a "low frequency $f_L$." The high frequency $f_H$ is from 0.8 to 1.2 kHz, for example. The low frequency $f_L$ is from 18 to 22 Hz, for example. The high frequency $f_H$ and low frequency $f_L$ are the names for distinguishing between frequency levels relative to each other and have different concepts from a "low frequency" or a "high frequency" as having general meanings.

In step S20, while the signal superimposing part 12 superimposes the AC signals, the impedance measuring part 11$i$ makes the stack voltage measuring part 14 measure the waveform of an output voltage from the fuel cell stack 20 as a determination target and makes the cell voltage measuring part 15 measure the waveform of an output voltage from each fuel cell 21. Further, the impedance measuring part 11$i$ makes the current measuring part 13 measure the waveform of an output current from the fuel cell stack 20. A cell voltage Vc, a stack voltage Vs, and an output current Is acquired by these measurements are voltage values or current values of a response current generated by the superimposition of the AC currents.

The impedance measuring part 11$i$ calculates an impedance at each fuel cell 21 as a determination target using the cell voltage Vc and the output current Is. Further, the impedance measuring part 11$i$ calculates an impedance at the fuel cell stack 20 as a whole using the stack voltage Vs and the output current Is. The impedance measuring part 11$i$ calculates the absolute and phase angle of an impedance at a fuel cell 21 as a determination target and those of an impedance at the fuel cell stack 20 as a whole at each of the high frequency $f_H$ and the low frequency $f_L$ according to the fast Fourier transform (also called FFT), for example.

Figure 4:
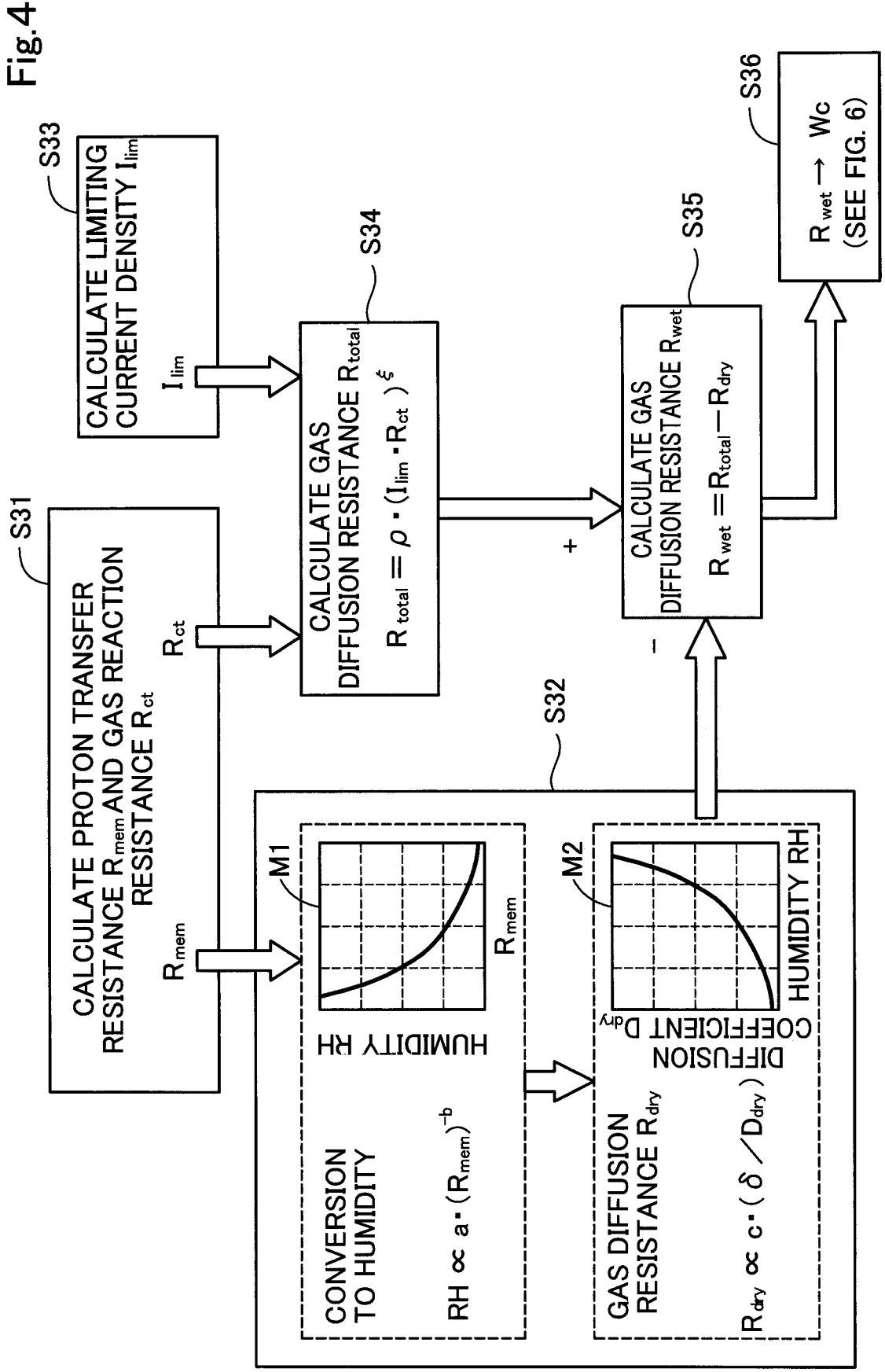
FIG. 4 is an explanatory view showing steps of water content estimated value calculating process.
Figure 5:
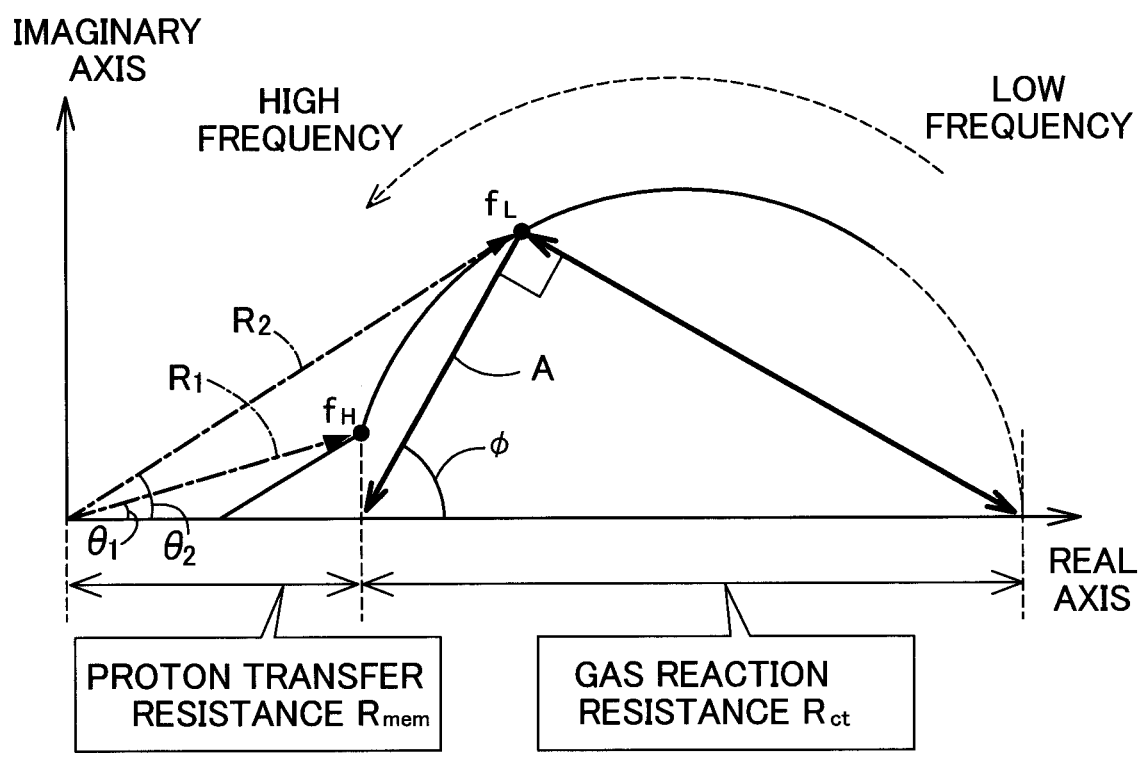
FIG. 5 is an explanatory view for explaining a proton transfer resistance and a gas reaction resistance.
Figure 6:
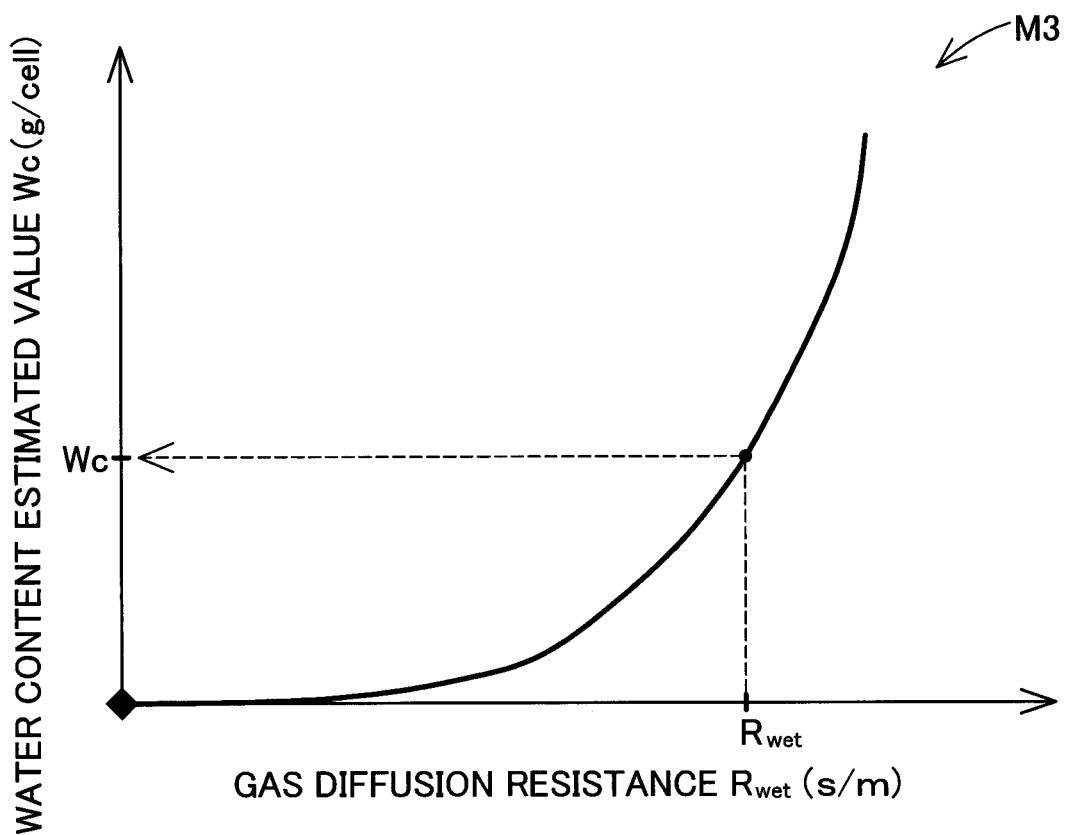
FIG. 6 is an explanatory view showing an example of a map representing a correlation between a gas diffusion resistance and a water content estimated value.

Referring to FIGS. 4 to 6, water content estimated value calculating process in step S30 will be described. In step S30, the water content estimating part 11$w$ calculates a water content estimated value Wc at each fuel cell 21 as a determination target using the impedance at each fuel cell 21 as the determination target calculated in step S20.

FIG. 4 is an explanatory view showing steps of the water content estimated value calculating process. First, in step S31, the diffusion resistance calculating part 11$r$ of the water content estimating part 11$w$ calculates a proton transfer resistance $R_{mem}$ and a gas reaction resistance $R_{ct}$ at each fuel cell 21.

Referring to FIG. 5, the proton transfer resistance $R_{mem}$ and the gas reaction resistance $R_{ct}$ will be described. FIG. 5 shows a Cole-Cole plot as a characteristic diagram showing a relationship between a frequency and an impedance illustrated on a complex plane. The proton transfer resistance $R_{mem}$ corresponds to an impedance value on the real axis at the high frequency $f_H$. The gas reaction resistance $R_{ct}$ corresponds to a value obtained by subtracting an impedance value on the real axis at the high frequency $f_H$ from a value on the real axis at a point of intersection of an arc-like impedance path and the real axis.

The proton transfer resistance $R_{mem}$ is a component resulting from conversion of a resistance overpotential to a resistance. The resistance overpotential increases in response to drying of an electrolyte membrane. The proton transfer resistance $R_{mem}$ is calculated using an impedance acquired in response to an alternating current at the high frequency $f_H$. More specifically, the proton transfer resistance $R_{mem}$ is calculated by applying an absolute $R_1$ and a phase $\theta_1$ of the impedance at the high frequency $f_H$ to the following formula F1:

$$R_{mem}=R_1 \cdot \cos \theta_1 \qquad (F1)$$

The gas reaction resistance $R_{ct}$ is a component resulting from conversion of an activation overpotential and a concentration overpotential to resistances. The gas reaction resistance $R_{ct}$ is calculated as follows using an impedance acquired in response to an alternating current at the low frequency $f_L$ and the proton transfer resistance $R_{mem}$. First, the absolute $R_1$, an absolute $R_2$, and a phase $\theta_2$ of the impedances at the corresponding low frequency $f_L$ or high frequency $f_H$ are applied to the following formulas F2 and F3 to calculate a component $\varphi$ and a component A indicating the characteristics of the gas reaction resistance $R_{ct}$ in the impedance at the low frequency $f_L$ as follows:

$$\varphi=\tan^{-1}[(R_2 \cdot \sin \theta_2)/\{(R_2 \cdot \cos \theta_2)-R_{mem}\}] \qquad (F2)$$

$$A=(R_2 \cdot \sin \theta_2)/\sin \varphi \qquad (F3)$$

Next, $\varphi$ and A acquired from the foregoing formulas F2 and F3 are applied to the following formula $F_4$ to calculate the gas reaction resistance $R_{ct}$:

$$R_{ct}=A/\cos \varphi \qquad (F4)$$

Referring to FIG. 4, in steps from S32 to S35, the diffusion resistance calculating part 11$r$ calculates three gas diffusion resistances $R_{total}$, $R_{wet}$, and $R_{dry}$. Each of the gas diffusion resistances $R_{total}$, $R_{wet}$, and $R_{dry}$ is expressed in a unit "s/m." The gas diffusion resistance $R_{total}$ is a parameter indicating difficulty for the reactive gas to be diffused into the catalyst layer 54. The gas diffusion resistance $R_{total}$ corresponds to the sum of the two gas diffusion resistances $R_{wet}$ and $R_{dry}$. Namely, $R_{total}=R_{wet} R_{dry}$.

The gas diffusion resistance $R_{wet}$ is a parameter indicating diffusion characteristics to change on the basis of flooding inside the fuel cell stack 20. The gas diffusion resistance $R_{wet}$ is largely influenced by a state of water in the fuel cell 21 to change. The gas diffusion resistance $R_{dry}$ is a parameter indicating diffusion characteristics to change on the basis of drying up. The gas diffusion resistance $R_{dry}$ is largely influenced by a drying state in the fuel cell 21 to change.

In step S32, the diffusion resistance calculating part 11$r$ calculates the gas diffusion resistance $R_{dry}$ using the proton transfer resistance $R_{mem}$. The proton transfer resistance $R_{mem}$ has a correlation with a humidity RH in the fuel cell 21 expressed by the following formula F5. The diffusion resistance calculating part 11$r$ contains a map M1 representing a relationship defined in the formula F5 stored in advance and converts the proton transfer resistance $R_{mem}$ to the humidity RH by referring to the map M1. In the formula F5, "a" and "b" are constants.

$$RH \propto a \cdot (R_{mem})^{-b} \qquad (F5)$$

The gas diffusion resistance $R_{dry}$ has a correlation with a diffusion coefficient $D_{dry}$ expressed by the following formula F6 and is inversely proportional to the diffusion coefficient $D_{dry}$. The diffusion coefficient $D_{dry}$ is correlated with the humidity RH in the fuel cell 21 in such a manner as to become larger with increase in the humidity RH. The diffusion resistance calculating part 11$r$ calculates the diffusion coefficient $D_{dry}$ from the humidity RH using a map M2 stored in advance containing the correlation between the humidity RH and the diffusion coefficient $D_{dry}$. The diffusion resistance calculating part 11$r$ calculates the gas diffusion resistance $R_{dry}$ using the calculated diffusion coefficient $D_{dry}$ based on the correlation expressed by the following formula F6 stored in advance. In this formula, "c" is a constant and "δ" is the thickness of the gas diffusion layer 55.

$$R_{dry} \propto c \cdot (\delta/D_{dry}) \tag{F6}$$

In step S33, the diffusion resistance calculating part 11r uses the following formulas F7 to F11 to calculate a limiting current density $I_{lim}$ to be used for calculating the gas diffusion resistance $R_{total}$. In these formulas, "F" is a Faraday's constant, "R" is a gas constant, "T" is a temperature, "n" is a constant, "I" is a current density, "$I_O$" is an exchange current density, "E" is a control voltage, "$E_O$" is a theoretical electromotive voltage, "$\eta_c$" is a concentration overpotential, "$\eta_a$" is an activation overpotential, "$\eta_R$" is a resistance overpotential, and "q" is a constant indicating a charge transfer coefficient.

$$L_{lim} = \{e^p/(e^p - 1)\} \cdot I \tag{F7}$$

$$p = (\eta_c \cdot n \cdot F)/(2 \cdot R \cdot T) \tag{F8}$$

$$\eta_c = E_O - E - \eta_a - \eta_R \tag{F9}$$

$$\eta_a = (R \cdot T/2 \cdot q \cdot F) \ln(I/I_O) \tag{F10}$$

$$\eta_R = I \cdot R_{mem} \tag{F11}$$

In step S34, the diffusion resistance calculating part 11r applies the gas reaction resistance $R_{ct}$ obtained in step S31 and the limiting current density $I_{lim}$ calculated in step S33 to the following formula $F_{12}$ as a function stored in advance to calculate the gas diffusion resistance $R_{total}$. In the following formula, "ρ" and "ξ" are constants set by fitting an actually measured value and an estimated value of a gas diffusion resistance measured in advance using a limiting current density determined by changing a gas concentration of reactive gas in the fuel cell 21. The estimated value of the gas diffusion resistance is calculated from the gas reaction resistance $R_{ct}$ and the limiting current density $I_{lim}$.

$$R_{total} = \rho \cdot (R_{ct} \cdot I_{lim})^\xi \tag{F12}$$

In step S35, as shown in the following formula F13, the diffusion resistance calculating part 11r subtracts the gas diffusion resistance $R_{dry}$ from the gas diffusion resistance $R_{total}$ to calculate the gas diffusion resistance $R_{wet}$.

$$R_{wet} = R_{total} - R_{dry} \tag{F13}$$

FIG. 6 is an explanatory view showing an example of a map M3 representing a correlation between the gas diffusion resistance $R_{wet}$ and a water content estimated value at the fuel cell. The correlation represented by the map M3 is acquired by plotting actually measured values of a water content in the fuel cell 21 relative to the gas diffusion resistance $R_{wet}$.

In step S36, the water content estimating part 11w, which contains the map M3 stored in advance, uses the map M3 to acquire the water content estimated value Wc at the fuel cell 21 relative to the gas diffusion resistance $R_{wet}$ calculated in step S35. In step S36, the water content estimating part 11w may calculate the water content estimated value Wc using the following formula F14 representing the correlation shown in FIG. 6 approximately instead of using the map M3:

$$Wc = 10^{-8} \cdot R_{wet}^4 - 10^{-7} \cdot R_{wet}^3 - 10^{-5} \cdot R_{wet}^2 + 7 \cdot R_{wet}^{-4} \tag{F14}$$

As described above, the water content estimating part 11w derives the gas diffusion resistance $R_{wet}$ from a measured impedance value, and derives the water content estimated value Wc on the basis of the derived gas diffusion resistance $R_{wet}$. The measured impedance value itself is a parameter to fluctuate with a factor other than a state of water in the fuel cell 21. By contrast, the gas diffusion resistance $R_{wet}$ is one of components derived from the measured impedance value, having a high correlation with a water content in the fuel cell 21, and to fluctuate with high sensitivity in response to a state of water in the fuel cell 21. Thus, if the fuel cell 21 is in a normal state, the water content estimated value Wc derived on the basis of the gas diffusion resistance $R_{wet}$ indicates an actual water content in the fuel cell 21 with high accuracy.

Referring to FIG. 3, in step S40, the water content estimating part 11w calculates a water content reference estimated value Ws as follows indicating a water content in each fuel cell 21 from a measurement result about the impedance at the fuel cell stack 20 as a whole. First, the water content estimating part 11w performs arithmetic processing similar to that in step S31 in FIG. 4 using the impedance at the fuel cell stack 20 as a whole measured in step S20 to obtain a proton transfer resistance and a gas reaction resistance at the fuel cell stack 20 as a whole. The water content estimating part 11w divides the resultant proton transfer resistance and gas reaction resistance by the number of the fuel cells 21 in the fuel cell stack 20 to calculate a proton transfer resistance $R_{mem}A$ and a gas reaction resistance $R_{ct}A$ at each fuel cell 21. Next, the water content estimating part 11w performs arithmetic processing similar to that in steps from S32 to S35 in FIG. 4 using the proton transfer resistance $R_{mem}A$ and the gas reaction resistance $R_{ct}A$ instead of the proton transfer resistance $R_{mem}$ and the gas reaction resistance $R_{ct}$ at each fuel cell 21 to acquire a gas diffusion resistance $R_{wet}A$ at the fuel cell stack 20. The water content estimating part 11w acquires a water content estimated value relative to the gas diffusion resistance $R_{wet}A$ at the fuel cell stack 20 as the water content reference estimated value Ws using the map M3 in FIG. 6.

Figure 7:
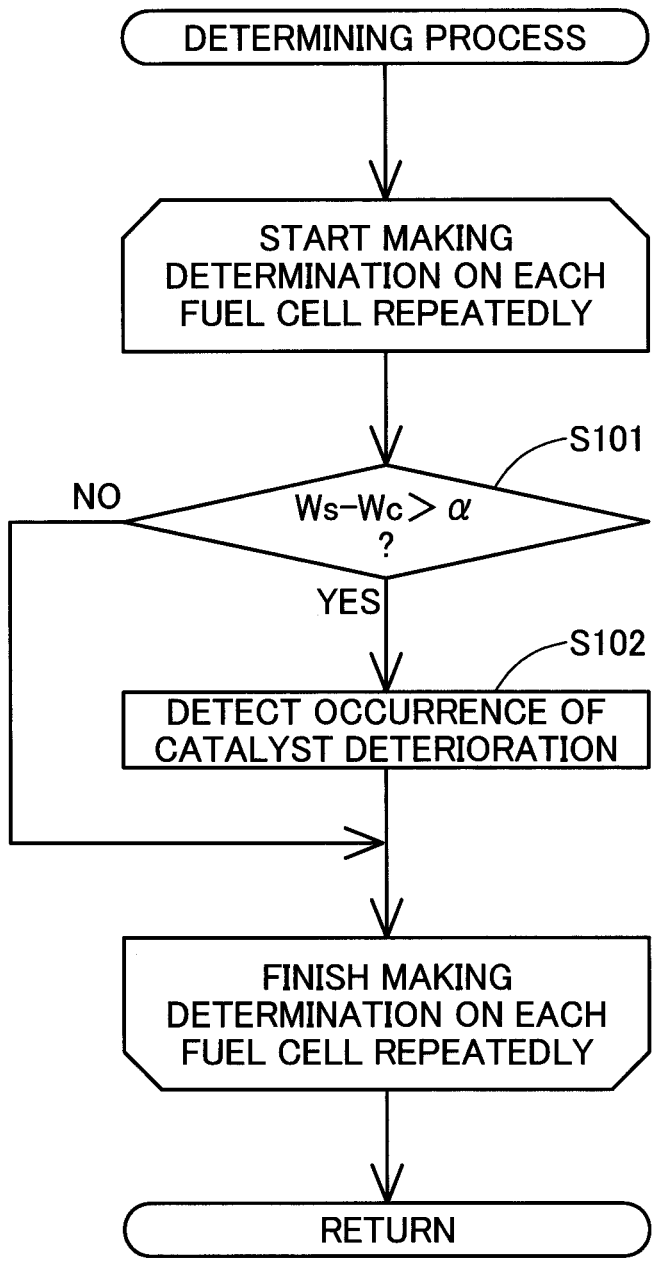
FIG. 7 is an explanatory view showing a flow of determining process of the first embodiment.

FIG. 7 is an explanatory view showing a flow of determining process of the first embodiment performed in step S50A by the determining part 11j. The determining part 11j makes a determination in step S101 repeatedly on each fuel cell 21 as a determination target to determine the presence or absence of catalyst deterioration at all the fuel cells 21 as determination targets.

In step S101, the determining part 11j determines the magnitude of the water content estimated value Wc at the fuel cell 21 as a determination target relative to the water content reference estimated value Ws as a reference value. More specifically, the determining part 11j determines whether a difference, obtained by subtracting the water content estimated value Wc at the fuel cell 21 as the determination target from the water content reference estimated value Ws, is larger than a predetermined positive threshold α. If the relationship of Ws−Wc>α is satisfied, the determining part 11j determines in step S102 that catalyst deterioration has occurred at the fuel cell 21 as the current determination target. The determining part 11j sets a flag indicating detection of the occurrence of the catalyst deterioration in association with an identifier for identifying the fuel cell 21 as the current determination target. If the relationship of Ws−Wc>α is not satisfied in step S101, the determining part 11j makes a determination in step S101 on a fuel cell 21 as a next determination target.

Figure 8:
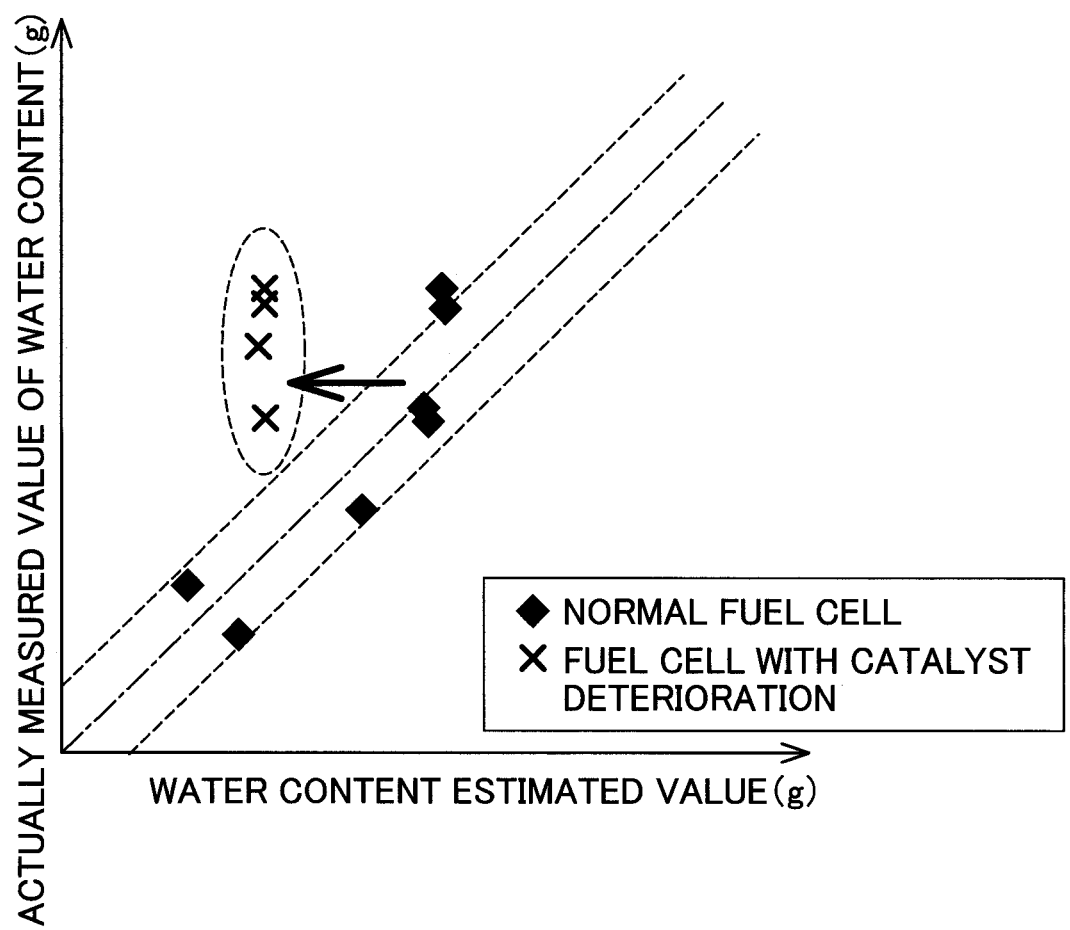
FIG. 8 is an explanatory view showing how a water content estimated value is changed by the presence or absence of catalyst deterioration.

FIG. 8 is an explanatory view showing a result of experiment conducted to examine how the accuracy of a water content estimated value is changed by the presence or absence of catalyst deterioration. FIG. 8 is a scatter diagram with a horizontal axis indicating a water content estimated value at the fuel cell and a vertical axis indicating an actually measured value of a water content. In FIG. 8, a straight line drawn as a one-dot chain line indicates ideal positions of distribution at each of which a water content estimated value agrees with an actually measured value of a water content, and dashed lines indicate a permissible range of error of a water content estimated value relative to an actually measured value of a water content. This experimental result shows that, in many normal fuel cells in the absence of catalyst deterioration, most of differences between water content estimated values and actually measured values were determined to fall within the permissible error range. By contrast, in many fuel cells in the presence of catalyst deterioration, water content estimated values were calculated as lower values than actually measured values.

Figure 9:
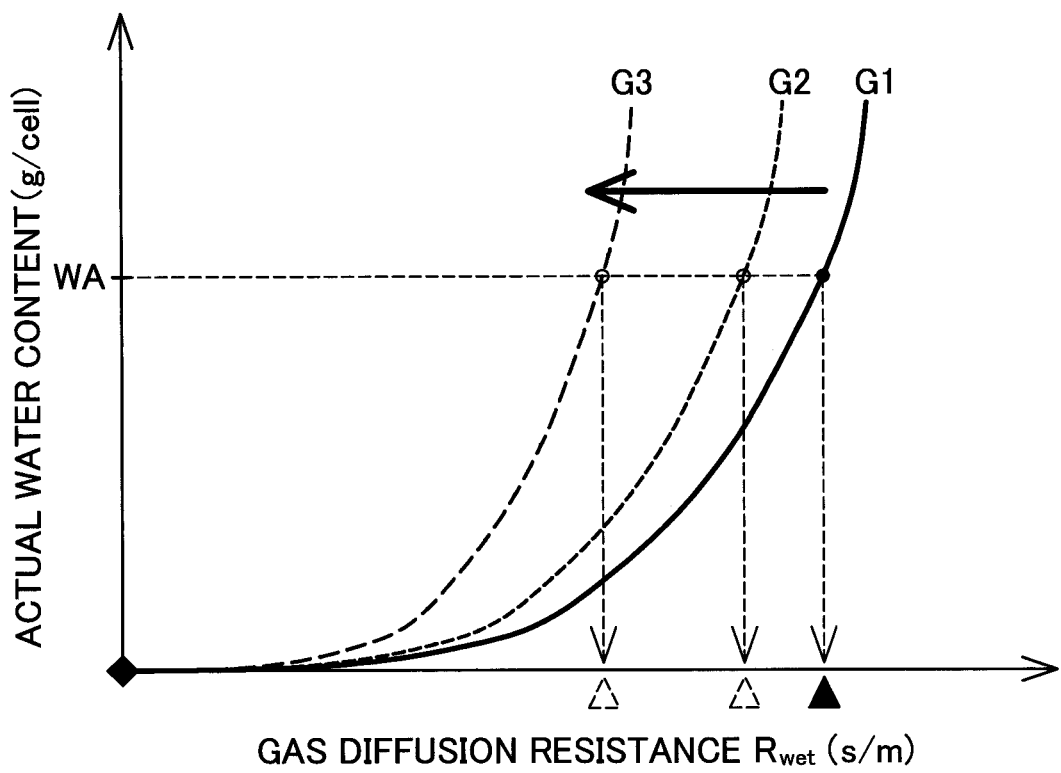
FIG. 9 is an explanatory view showing a relationship between a gas diffusion resistance and an actual water content in the fuel cell.

FIG. 9 is an explanatory view showing a relationship between the gas diffusion resistance $R_{wet}$ and an actual water content in a fuel cell acquired by experiment. A graph G1 in FIG. 9 shows a relationship acquired in a normal fuel cell. A graph G2 and a graph G3 each show a relationship acquired in a fuel cell in the presence of catalyst deterioration. The catalyst deterioration developed more seriously in the fuel cell corresponding to the graph G3 than in the fuel cell corresponding to the graph G2. These graphs show that, as catalyst deterioration develops more seriously, the gas diffusion resistance $R_{wet}$ takes a smaller value under the same water content WA. A possible reason for this is that, as catalyst deterioration develops more seriously, the gas reaction resistance $R_{ct}$ becomes lower.

As shown by the experimental results in FIGS. 8 and 9, the characteristics of the water content estimated value Wc are such that, on the occurrence of catalyst deterioration, the water content estimated value Wc is calculated as a lower value than an actual water content in the fuel cell 21. These characteristics are used in the determination in step S101 in which, while the water content reference estimated value Ws is used as a reference value approximate to an actual water content, it is determined whether the water content estimated value Wc at a fuel cell 21 as a determination target has reduced from the reference value Ws to an extent exceeding a permissible range. The threshold α as a determination condition is a value for defining this permissible range. The threshold α may be a value predetermined theoretically or experimentally so as to allow detection of catalyst deterioration having developed to an impermissible degree.

The determining process of the first embodiment uses the water content reference estimated value Ws as a reference value indicating a water content in each fuel cell 21 obtained from a measurement result about an impedance at the fuel cell stack 20 as a whole. The water content reference estimated value Ws is a value to fluctuate in response to change in the power generating performance of the fuel cell stack 20 as a whole with aging and to fluctuate in response to a current water content in the fuel cell stack 20. Thus, even such change with aging occurs at the fuel cell stack 20, it is still possible to correctly detect a fuel cell 21 at which catalyst deterioration develops particularly seriously.

Referring to FIG. 3, in step S60, the monitoring device controller 11 checks the flag set in the determining process in step S50A to determine the presence or absence of a fuel cell 21 as a determination target at which the occurrence of catalyst deterioration has been detected. If there is no fuel cell 21 at which the occurrence of catalyst deterioration has been detected, the monitoring device controller 11 finishes the monitoring process without proceeding further. If there is a fuel cell 21 at which the occurrence of catalyst deterioration has been detected, the monitoring device controller 11 performs process for suppressing development of the catalyst deterioration in step S70.

In step S70, the monitoring device controller 11 requests the system controller 25 to increase supply of the fuel gas more than usual, for example. The reason for this is that catalyst deterioration is likely to develop on the occurrence of shortage of supply of the fuel gas. In step S70, the monitoring device controller 11 may request the system controller 25 to limit an output current from the fuel cell stack 20 so as to prevent excess of the output current over a predetermined value. In step S70, if catalyst deterioration has been detected at fuel cells 21 of a larger number than a predetermined number, the monitoring device controller 11 may request the system controller 25 to stop power generation by the fuel cell stack 20. In step S70, the monitoring device controller 11 may perform process of notifying a user of the fuel cell vehicle of the occurrence of catalyst deterioration. In this notifying process, the user may also be notified of an identifier of a fuel cell 21 at which the catalyst deterioration has occurred. After implementation of the process in step S70, the monitoring device controller 11 finishes the monitoring process.

1-6. Conclusion of First Embodiment

As described above, according to the fuel cell monitoring device 10 of the first embodiment, it makes possible to detect catalyst deterioration occurring at some of the fuel cells 21 with high accuracy on the basis of the characteristics of the water content estimated value Wc derived from the gas diffusion resistance $R_{wet}$ obtained from a measurement result about an impedance. Therefore, according to the fuel cell system 100 including the fuel cell monitoring device 10, the occurrence of a defect due to development of catalyst deterioration is suppressed. Further, according to the fuel cell monitoring device 10 of the first embodiment, the fuel cell system 100 including the fuel cell monitoring device 10, and a method of determining the state of the fuel cell 21 implemented in the fuel cell monitoring device 10 and the fuel cell system 100, various functions and effects described in the first embodiment are achieved.

2. Second Embodiment

Figure 10:
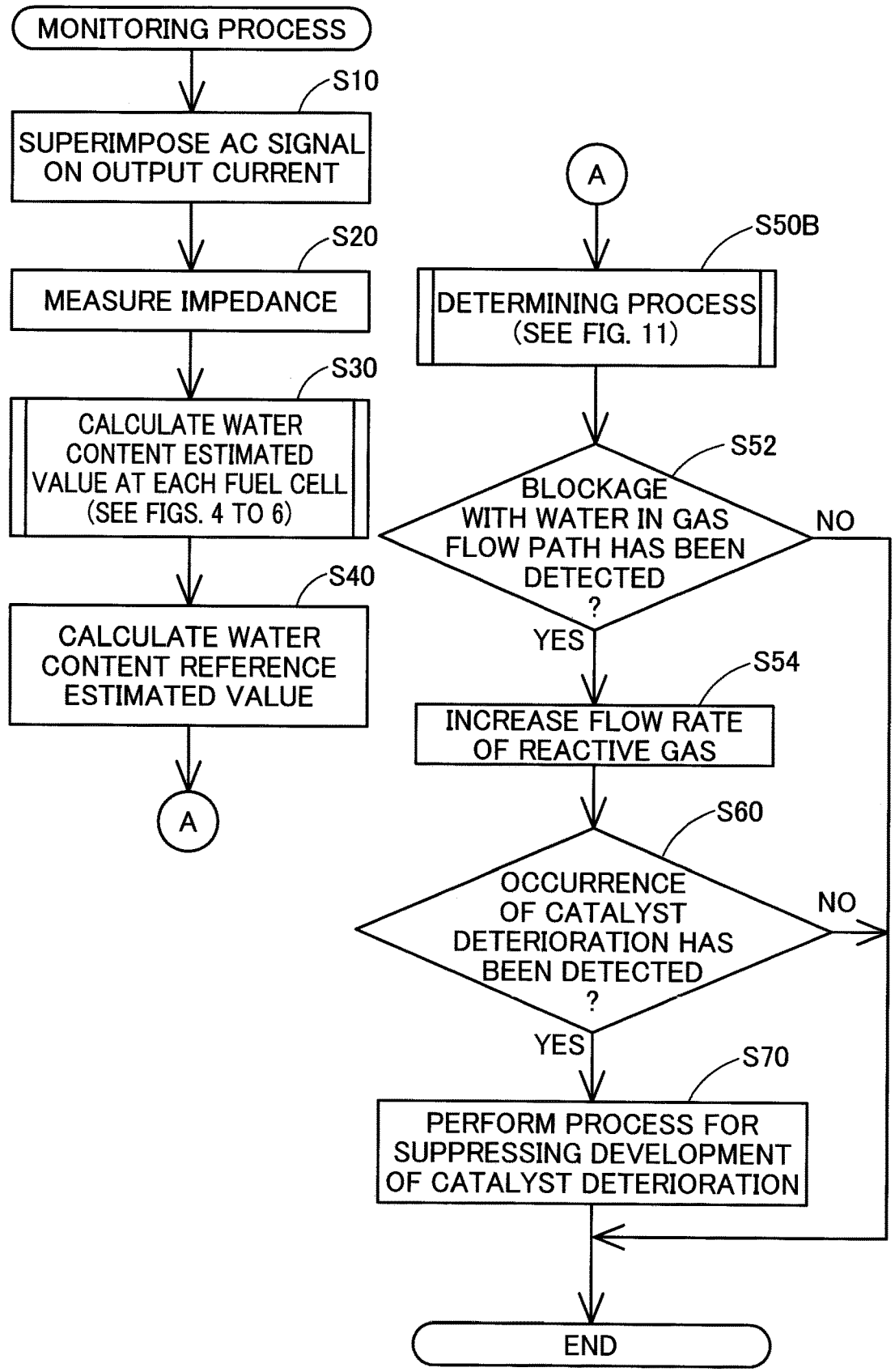
FIG. 10 is an explanatory view showing a flow of monitoring process of a second embodiment.

FIG. 10 is an explanatory view showing a flow of monitoring process of a second embodiment. The monitoring process of the second embodiment is performed by the fuel cell monitoring device 10 having the similar configuration as that described in the first embodiment. The fuel cell monitoring device 10 is mounted on the fuel cell system 100 having the similar configuration as that described in the first embodiment. The flow of the monitoring process of the second embodiment is substantially the same as the flow of the monitoring process of the first embodiment except that determining process in step S50B is performed instead of the determining process in step S50A of the first embodiment, and that processes in step S52 and step S54 are added. The monitoring device controller 11 follows the same way as that described in the first embodiment to calculate the water content estimated value Wc and the water content reference estimated value Ws in steps from S10 to S40. Then, the monitoring device controller 11 makes the determining part 11j determine the presence or absence of catalyst deterioration in the determining process in step S50B.

Figure 11:
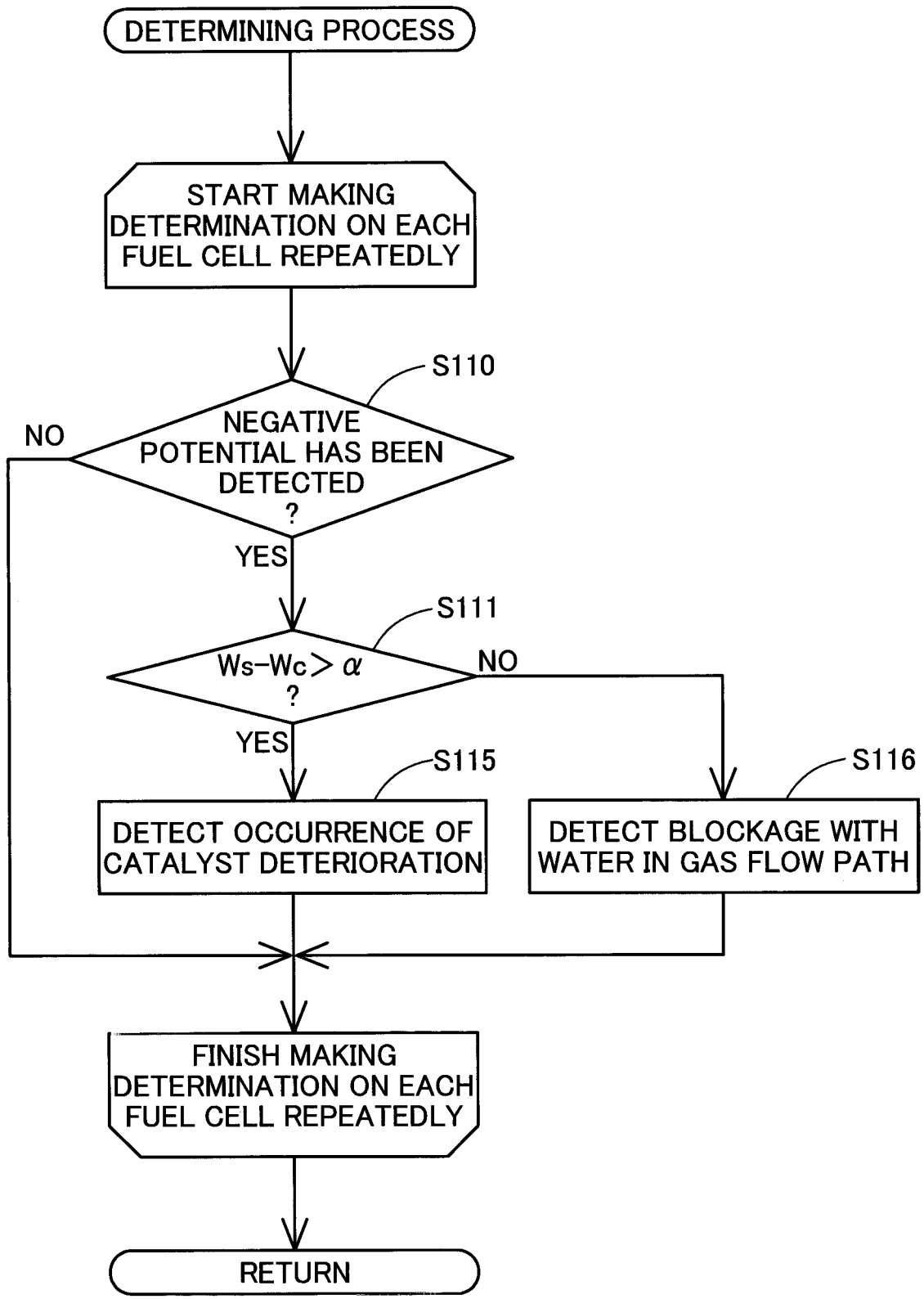
FIG. 11 is an explanatory view showing a flow of determining process of the second embodiment.

FIG. 11 is an explanatory view showing a flow of the determining process in step S50B. The determining process of the second embodiment differs from the determining process of the first embodiment in that a failure due to catalyst deterioration and a failure due to blockage with water in the gas flow path 63 are detected distinctively from each other by the presence of absence of a negative potential at the fuel cell 21. The determining part 11j performs the processes from step S110 to step S116 repeatedly on each fuel cell 21 as a determination target.

In step S110, the determining part 11j determines whether the cell voltage Vc at a fuel cell 21 as a determination target is a negative potential. On the occurrence of catalyst deterioration or blockage with water in the gas flow path 63 at the fuel cell 21, the cell voltage Vc of this fuel cell 21 becomes a negative potential. If a negative potential has not been detected at the fuel cell 21 as the determination target, the determining part 11j determines that there is no catalyst deterioration and there is no blockage with water in the gas flow path 63 at the fuel cell 21 as the determination target, and finishes the determination on this fuel cell 21.

If the occurrence of a negative potential is detected at the fuel cell 21 as the determination target, the determining part 11j determines in step S111 whether a cause for the negative potential is catalyst deterioration. Like in step S101 of the first embodiment in which the determining process is performed, in step S111, the determining part 11j determines the magnitude of the water content estimated value Wc using the water content reference estimated value Ws as a reference value.

If a difference, obtained by subtracting the water content estimated value Wc from the water content reference estimated value Ws, is larger than the predetermined threshold α, the determining part 11j detects the occurrence of catalyst deterioration at the fuel cell 21 as the determination target in step S115. The determining part 11j sets a flag indicating detection of the occurrence of the catalyst deterioration associated with an identifier for identifying this fuel cell 21.

If the difference, obtained by subtracting the water content estimated value Wc from the water content reference estimated value Ws, is less than the predetermined threshold α, the determining part 11j detects the occurrence of blockage with water in the gas flow path 63 at the fuel cell 21 as the determination target. The determining part 11j sets a flag in step S116 indicating detection of the occurrence of the blockage with water in the gas flow path 63 in association with an identifier for identifying the fuel cell 21 as the current determination target.

Figure 12:
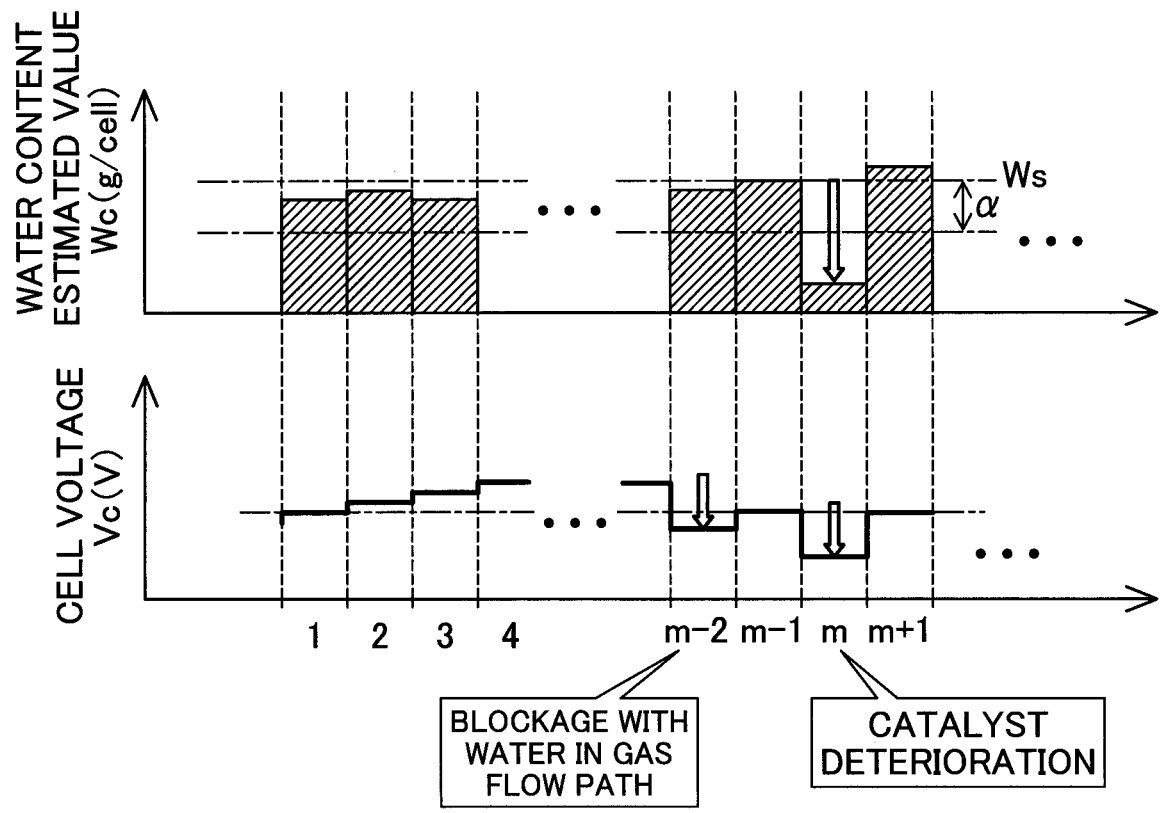
FIG. 12 is an explanatory view showing an example of a determination result obtained by the determining process of the second embodiment.

FIG. 12 is an explanatory view showing an example of a determination result acquired by the determining process of the second embodiment. FIG. 12 shows the water content estimated values Wc and the cell voltages Vc at fuel cells 21 as determination targets from a first fuel cell 21 to an (m+1)th fuel cell 21. Assuming that there are n fuel cells 21 as the determination targets, m is any natural number not exceeding (n−1). According to the example in FIG. 12, by the implementation of the determining process of the second embodiment, the occurrence of blockage with water in the gas flow path 63 is detected at the (m−2)th fuel cell 21 at which only the occurrence of a negative potential has been detected. Catalyst deterioration is detected at the m-th fuel cell 21 at which the occurrence of a negative potential and reduction in the water content estimated value Wc from the water content reference estimated value Ws to an extent exceeding a permissible range have been detected.

Referring to FIG. 10, in step S52, the monitoring device controller 11 determines the presence or absence of a fuel cell 21 as a determination target at which the occurrence of blockage with water in the gas flow path 63 has been detected. If there is a fuel cell 21 at which the occurrence of blockage with water in the gas flow path 63 has been detected, the monitoring device controller 11 requests the system controller 25 in step S54 to perform process of increasing the flow rate of the reactive gas more than usual for blowing away the water blocking the gas flow path 63.

Next, in step S60, the monitoring device controller 11 follows the same way as that described in the first embodiment to determine the presence or absence of a fuel cell 21 as a determination target at which the occurrence of catalyst deterioration has been detected. If there is a fuel cell 21 at which the occurrence of catalyst deterioration has been detected, the monitoring device controller 11 requests the system controller 25 in step S70 to perform process for suppressing development of the catalyst deterioration such as that described in the first embodiment.

As described above, the fuel cell monitoring device 10 that performs the monitoring process of the second embodiment additionally makes a determination based on the cell voltage Vc as a determination for detecting catalyst deterioration, thereby increasing accuracy in detecting catalyst deterioration. Further, the fuel cell monitoring device 10 of the second embodiment makes it possible to detect a failure due to catalyst deterioration and a failure due to blockage with water in the gas flow path 63 distinctively from each other. The fuel cell system 100 including the fuel cell monitoring device 10 of the second embodiment identifies catalyst deterioration or blockage with water in the gas flow path 63 as a factor for the occurrence of a failure to allow implementation of appropriate handling process responsive to the factor for the occurrence of the failure. Further, according to the fuel cell monitoring device 10 of the second embodiment, the fuel cell system 100 including the fuel cell monitoring device 10, and a method of determining the state of the fuel cell 21 implemented in the fuel cell monitoring device 10 and the fuel cell system 100, various functions and effects comparable to those described in the first embodiment are achieved.

3. Third Embodiment

Figure 13:
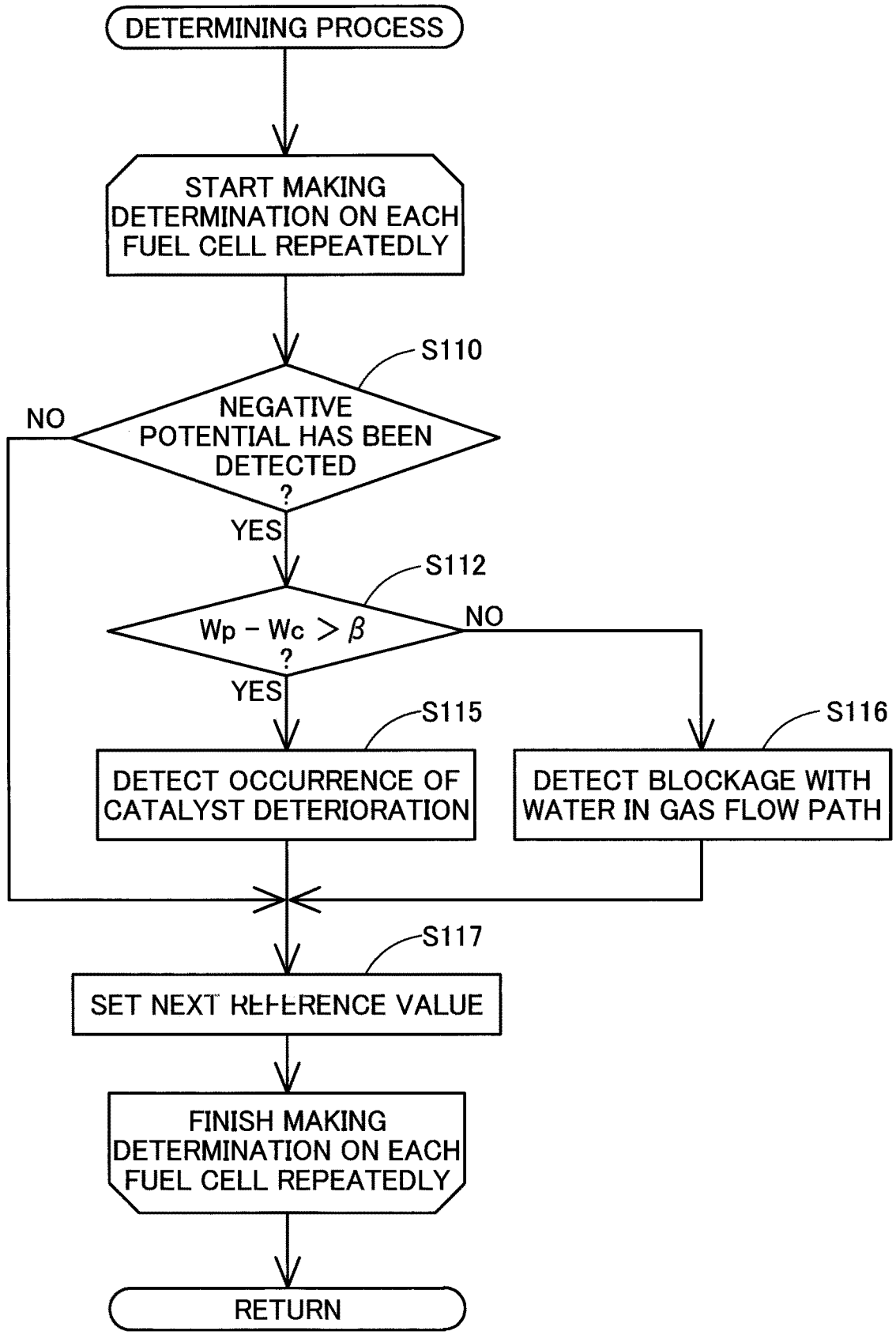
FIG. 13 is an explanatory view showing a flow of determining process of a third embodiment.

FIG. 13 is an explanatory view showing a flow of determining process performed in monitoring process of a third embodiment. The monitoring process of the third embodiment is performed by the fuel cell monitoring device 10 having the similar configuration as that described in the first embodiment. The fuel cell monitoring device 10 is mounted on the fuel cell system 100 having the similar configuration as that described in the first embodiment. The flow of the monitoring process of the third embodiment is substantially the same as the flow of the monitoring process of the second embodiment except in the details of the determining process performed by the determining part 11j. In the third embodiment, the process of measuring an impedance at the fuel cell stack 20 as a whole in step S20 and the process of calculating the water content reference estimated value Ws in step S40 are omissible.

The determining process of the third embodiment is substantially the same as the determining process described in the second embodiment except that, instead of a determination in step S111, the determining part 11j makes a determination in step S112 for detecting the presence or absence of catalyst deterioration under a different determination condition. The determining part 11j makes determinations repeatedly on all of multiple fuel cells 21 as determination targets by following predetermined order. In the third embodiment, the order of making determinations on the fuel cells 21 as the determination targets corresponds to the order in which these fuel cells 21 are stacked in the fuel cell stack 20.

The determining part 11j makes a determination in step S112 on a fuel cell 21 at which a negative potential has been detected in step S110. In step S112, the determining part 11j makes a determination using the water content estimated value Wc at a fuel cell 21 as a reference value Wp having been determined previously and at which catalyst deterioration has not been detected. When the determination in step S112 is made for the first time, an initial value previously set is used as the reference value Wp. If the water content estimated value Wc at a fuel cell 21 as a current determination target has been reduced from the reference value Wp to an extent exceeding a predetermined permissible range, the determining part 11j determines that catalyst deterioration has occurred at the fuel cell 21 as the current determination target. In step S112, if a value obtained by subtracting the water content estimated value Wc from the reference value Wp is larger than a positive threshold β predetermined as the permissible range, the determining part 11j determines in step S115 that catalyst deterioration has occurred at this fuel cell 21. The determining part 11j sets a flag indicating detection of the occurrence of the catalyst deterioration in association with an identifier for identifying the fuel cell 21 as the determination target. If the value obtained by subtracting the water content estimated value Wc from the reference value Wp is less than the threshold β, the determining part 11j detects blockage with water in the gas flow path 63 in step S116 as a cause for the negative potential detected at this fuel cell 21 in step S110. The determining part 11j sets a flag indicating detection of the blockage with water in the gas flow path 63 in association with an identifier for identifying the fuel cell 21 as the determination target.

In step S117, the reference value Wp is set to be used for making a determination in step S112 performed subsequently. If catalyst deterioration has not been detected in step S112, the water content estimated value Wc at the fuel cell 21 as the determination target in this step is set as the reference value Wp for a subsequent determination. Meanwhile, if catalyst deterioration has been detected at the fuel cell 21 in step S112, the water content estimated value Wc at this fuel cell 21 indicates the occurrence of the catalyst deterioration. Hence, using this water content estimated value Wc as the reference value Wp for making a determination on a subsequent determination target is not preferred. Thus, in this case, the determining part 11j does not change the reference value Wp but continuously uses a value employed in the current determination as it is as the reference value Wp.

As a result of the determining process of the third embodiment, the occurrence of catalyst deterioration is detected at a fuel cell 21 taking a negative potential and having the water content estimated value Wc reduced remarkably to an extent deviating from the tendency of the fuel cells 21 entirely as determination targets. Thus, even in the absence of a calculated water content reference estimated value Ws, this still makes it possible to detect a fuel cell 21 subjected to more serious catalyst deterioration than those at the other fuel cells 21 with high accuracy, like in the case of using the water content reference estimated value Ws as a reference value for the determination. Further, according to the fuel cell monitoring device 10 of the third embodiment, the fuel cell system 100 including the fuel cell monitoring device 10, and a method of determining the state of the fuel cell 21 implemented in the fuel cell monitoring device 10 and the fuel cell system 100, various functions and effects comparable to those described in each of the foregoing embodiments are achieved.

4. Fourth Embodiment

Figure 14:
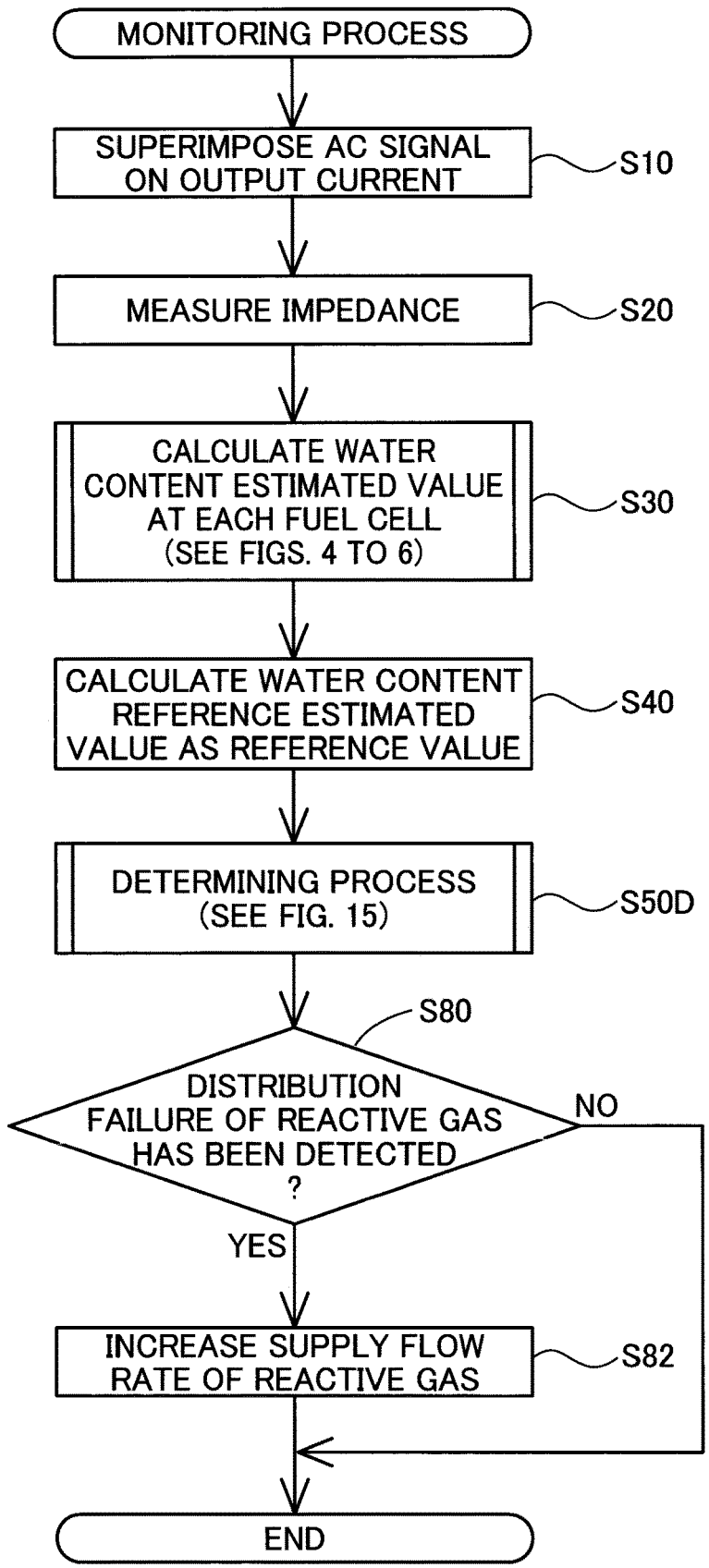
FIG. 14 is an explanatory view showing a flow of monitoring process of a fourth embodiment.

FIG. 14 is an explanatory view showing a flow of monitoring process of a fourth embodiment. The monitoring process of the fourth embodiment is performed by the fuel cell monitoring device 10 having the similar configuration as that described in the first embodiment. The fuel cell monitoring device 10 is mounted on the fuel cell system 100 having the similar configuration as that described in the first embodiment. The fuel cell monitoring device 10 performs the monitoring process in a predetermined cycle while the fuel cell stack 20 generates power.

The monitoring process of the fourth embodiment is to detect the occurrence of a distribution failure of the reactive gas at each fuel cell 21 in the fuel cell stack 20 using the water content estimated value Wc and the water content reference estimated value Ws acquired in the processes from step S10 to step S40 described in the first embodiment. The "distribution failure of the reactive gas" means a defect occurring if supply of the reactive gas distributed to the fuel cell 21 via the manifold falls below a reference amount while the fuel cell stack 20 generates power.

A target of determination in the monitoring process of the fourth embodiment is all the fuel cells 21 forming the fuel cell stack 20. In other embodiments, only some of the fuel cells 21 forming the fuel cell stack 20 may be selected in advance as determination targets. If only some of the fuel cells 21 are to be determination targets, these determination targets desirably include at least a fuel cell 21 at an end of the fuel cell stack 20 viewed in the stacking direction. The reason for this is that a distribution failure of the reactive gas is likely to be caused by liquid or water accumulated in the manifold at such a fuel cell 21 at the end. In the monitoring process of the fourth embodiment, the water content estimated value Wc and the water content reference estimated value Ws are acquired in steps from S10 to S40 in the same way as that described in the first embodiment. Then, determining process in step S50D is performed.

Figure 15:
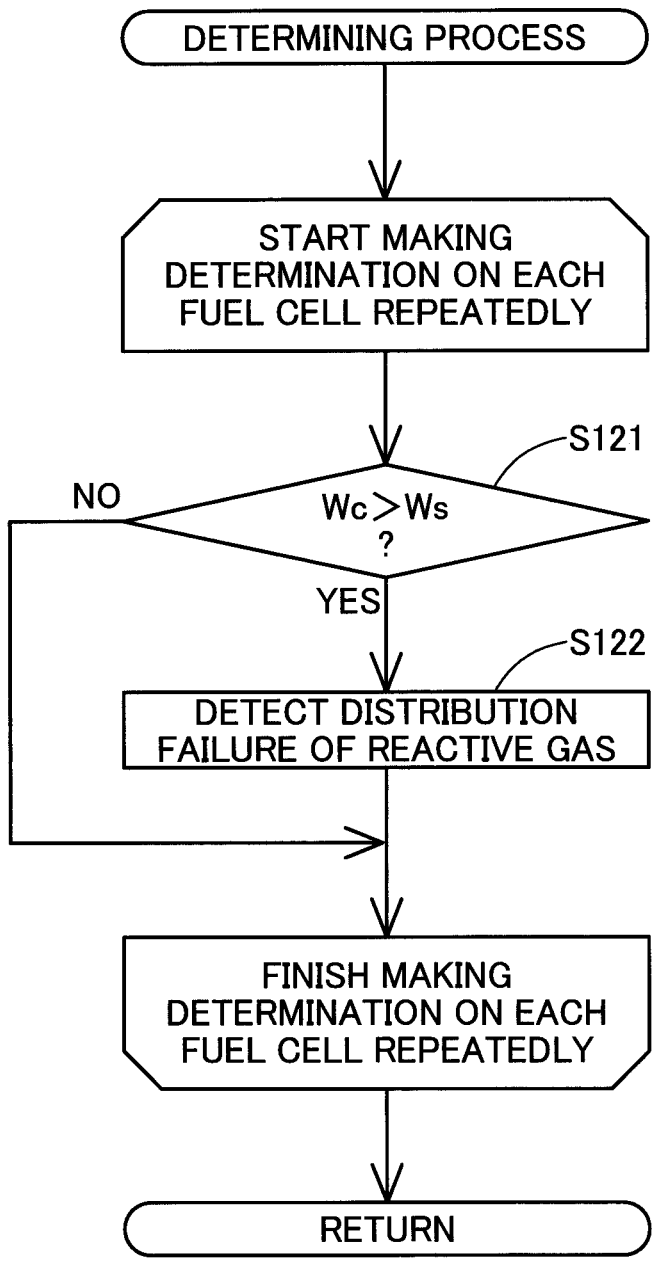
FIG. 15 is an explanatory view showing a flow of determining process of the fourth embodiment.

FIG. 15 is an explanatory view showing a flow of the determining process of the fourth embodiment performed by the determining part 11j in step S50D. The determining part 11j makes a determination in step S121 repeatedly on each fuel cell 21 as a determination target to determine the presence or absence of a distribution failure of the reactive gas at all the fuel cells 21 as determination targets.

In step S121, the determining part 11j determines whether the water content estimated value Wc at a fuel cell 21 as a determination target is larger than the water content reference estimated value Ws. If Wc>Ws is satisfied, the determining part 11j detects the occurrence of a distribution failure of the reactive gas at the fuel cell 21 as the current determination target in step S122. The determining part 11j sets a flag indicating detection of the occurrence of the distribution failure of the reactive gas in association with an identifier for identifying the fuel cell 21 as the current determination target. If Wc>Ws is not satisfied in step S121, the determining part 11j finishes the determination on the fuel cell 21 as the current determination target.

Figure 16:
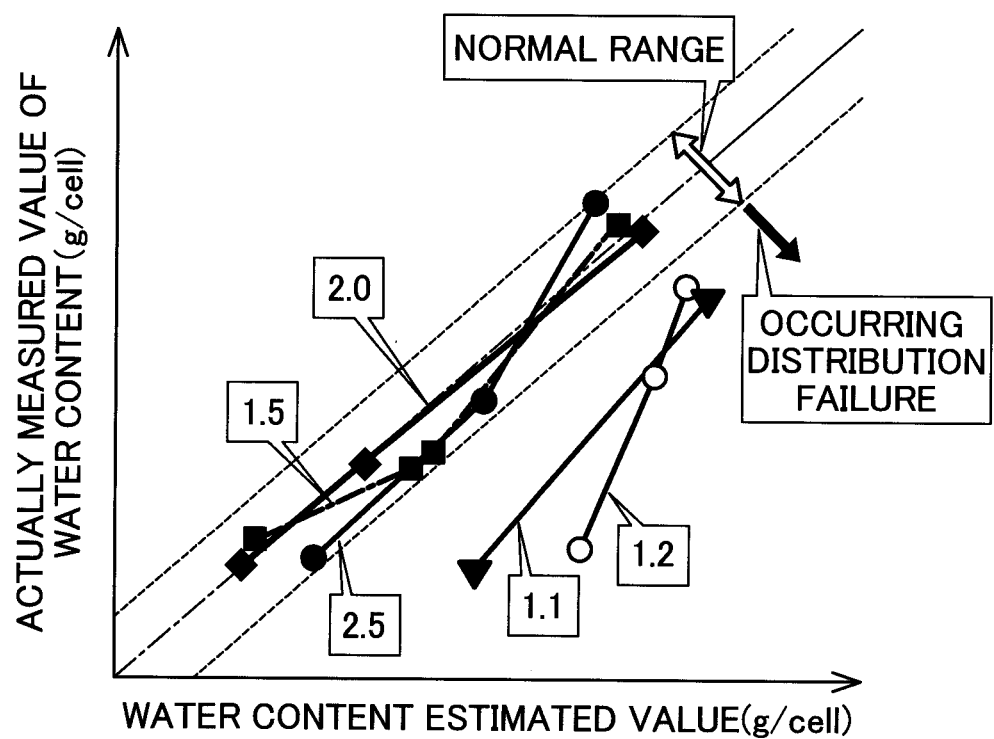
FIG. 16 is an explanatory view showing change in the accuracy of a water content estimated value relative to change in the stoichiometric ratio of reactive gas.

FIG. 16 is an explanatory view showing a result of experiment conducted to examine how the accuracy of a water content estimated value changes relative to change in the stoichiometric ratio of the reactive gas. FIG. 16 is a scatter diagram with a horizontal axis indicating a water content estimated value at a fuel cell and a vertical axis indicating an actually measured value of a water content. Like in FIG. 8, a straight line in FIG. 16 drawn as a one-dot chain line indicates ideal positions of distribution at each of which a water content estimated value agrees with an actually measured value of a water content, and dashed lines in FIG. 16 indicate a permissible range of error of a water content estimated value relative to an actually measured value of a water content.

The "stoichiometric ratio of the reactive gas" is defined as the ratio of actual supply of the reactive gas to supply of the reactive gas theoretically required for the amount of power to be generated by the fuel cell stack 20. Graphs in FIG. 16 are plots drawn at corresponding ones of the stoichiometric ratios of the reactive gas while the stoichiometric ratios of the reactive gas are set to 1.1, 1.2, 1.5, 2.0, and 2.5. In FIG. 16, numbers in boxes show the stoichiometric ratios of the reactive gas at which the corresponding graphs are drawn. This experimental result shows that, at the stoichiometric ratio of the reactive gas less than 1.5, an acquired water content estimated value is high compared to an actually measured value of a water content so the accuracy of the water content estimated value was determined to deviate from the permissible range.

Figure 17:
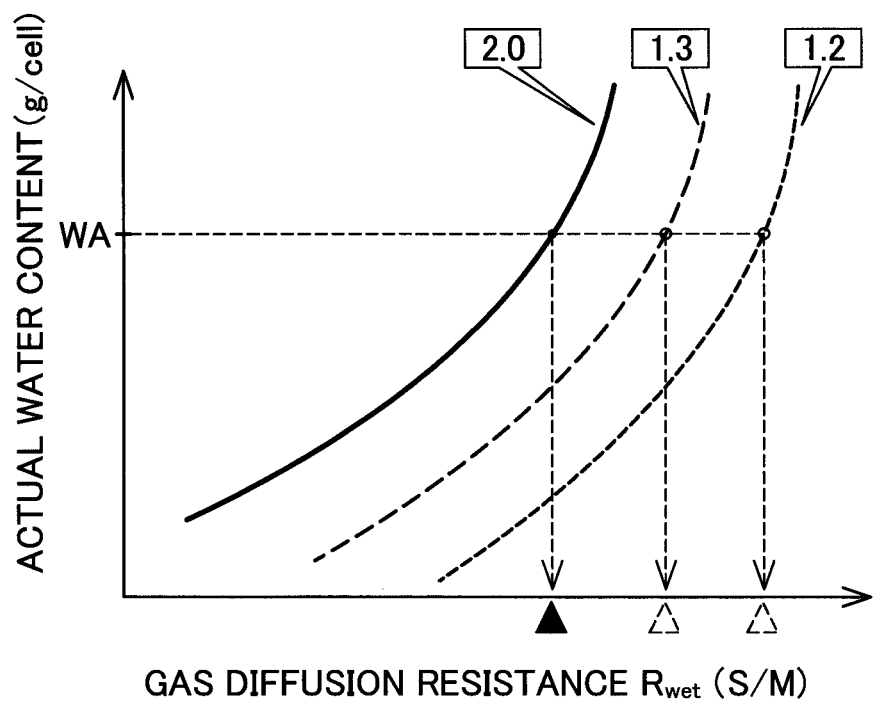
FIG. 17 is an explanatory view showing a relationship between a gas diffusion resistance and an actual water content in the fuel cell.

FIG. 17 is an explanatory view showing a relationship between the gas diffusion resistance $R_{wet}$ and an actual water content in a fuel cell acquired by experiment. Graphs in FIG. 17 are acquired at corresponding ones of the stoichiometric ratios of the reactive gas set to 1.2, 1.3, and 2.0. In FIG. 17, numbers in boxes show the stoichiometric ratios of the reactive gas at which the corresponding graphs are drawn. These graphs show that, as the stoichiometric ratio of the reactive gas is reduced, the gas diffusion resistance $R_{wet}$ takes a larger value under the same water content WA.

As shown by the experimental results in FIGS. 16 and 17, the characteristics of the water content estimated value Wc are such that, as the stoichiometric ratio of the reactive gas is reduced further at the fuel cell 21, the water content estimated value Wc is calculated as a higher value than an actual water content. In step S121, the water content reference estimated value Ws is used as a reference value approximate to an actual value of a water content in each fuel cell 21 obtained relative to the current stoichiometric ratio of the reactive gas at the fuel cell stack 20 as a whole. In step S121, if the water content estimated value Wc at a fuel cell 21 as a determination target is larger than the water content reference estimated value Ws, it is determined that the stoichiometric ratio of the reactive gas has been reduced at this fuel cell 21 as the determination target from those at the other fuel cells 21 and thus a distribution failure of the reactive gas has occurred at this fuel cell 21.

Referring to FIG. 14, in step S80, the monitoring device controller 11 checks the flag set in the determining process in step S50D to determine the presence or absence of a fuel cell 21 as a determination target at which the occurrence of a distribution failure of the reactive gas has been detected. If there is no fuel cell 21 at which the occurrence of a distribution failure of the reactive gas has been detected, the monitoring device controller 11 finishes the monitoring process without proceeding further.

If there is a fuel cell 21 at which the occurrence of a distribution failure of the reactive gas has been detected, the monitoring device controller 11 performs process for overcoming the distribution failure of the reactive gas in step S82. The monitoring device controller 11 requests the system controller 25 to perform process of temporarily increasing the supply flow rate of the reactive gas more than usual. This process may be said to be process of temporarily increasing the stoichiometric ratio of the reactive gas more than usual. In step S82, the monitoring device controller 11 may perform process of notifying a user of the fuel cell vehicle of the occurrence of the distribution failure of the reactive gas. In this notifying process, the user may also be notified of an identifier of a fuel cell 21 at which the distribution failure of the reactive gas has occurred. In step S82, supply of the reactive gas responsive to an intended current in the fuel cell stack 20 may be increased in response to a larger number of fuel cells 21 at which distribution failures of the reactive gas have been detected.

Figure 18A:
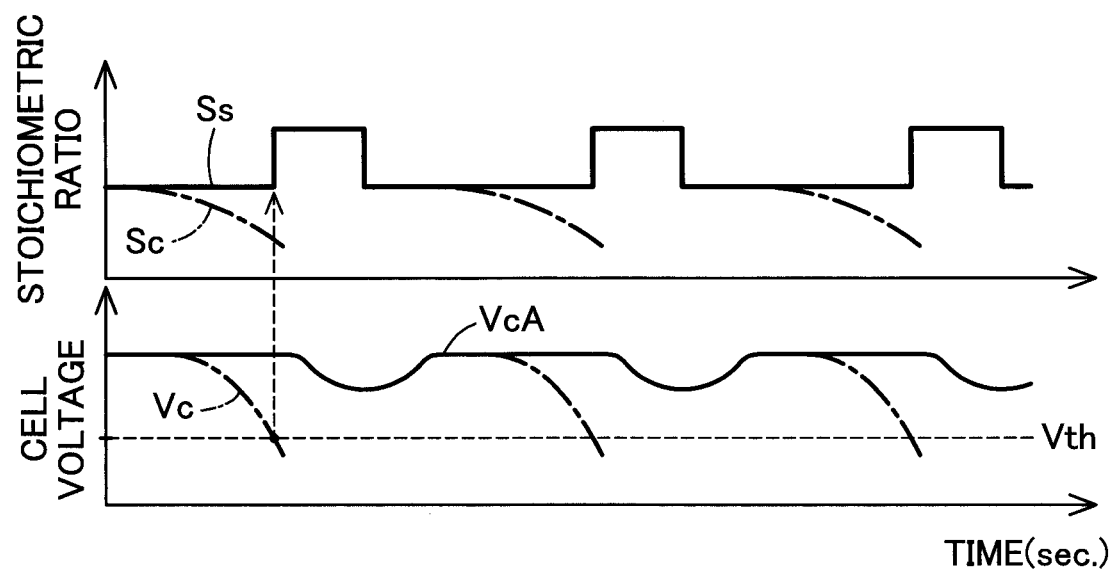
FIG. 18A is an explanatory view showing an example of temporal change in a cell voltage and that of temporal change in the stoichiometric ratio of reactive gas according to a comparative example.

FIG. 18A is an explanatory view showing temporal change in a cell voltage and temporal change in the stoichiometric ratio of the reactive gas on the same temporal axis according to a comparative example. In FIG. 18A, a solid graph Ss about the stoichiometric ratio shows the stoichiometric ratio of the reactive gas at the fuel cell stack as a whole, and a graph Sc drawn as a one-dot chain line shows the stoichiometric ratio of the reactive gas at a single fuel cell as a target of detection of a distribution failure of the reactive gas. In FIG. 18A, a solid graph VcA about the cell voltage shows an average cell voltage at the fuel cell stack as a whole, and a graph Vc drawn as a one-dot chain line shows a cell voltage at a single fuel cell as a target of detection of a distribution failure of the reactive gas. In this comparative example, if the cell voltage Vc becomes lower than a predetermined threshold Vth, the occurrence of a distribution failure of the reactive gas is determined. Then, process of temporarily increasing the stoichiometric ratio of the reactive gas is performed for overcoming the failure.

The process of the comparative example fails to determine whether reduction in a cell voltage has been caused by temporary error fluctuations or by a distribution failure of the reactive gas. This prohibits increasing the stoichiometric ratio of the reactive gas until the cell voltage reduces to an extent exceeding a threshold. Even if the stoichiometric ratio of the reactive gas is increased after such reduction in the cell voltage is detected, liquid or water in large quantities to cause the distribution failure of the reactive gas is accumulated in the manifold in a relatively long period of time before the remarkable reduction in the cell voltage is detected, and removing such liquid or water takes time. Increasing the flow rate of the reactive gas for a long period of time dries an electrolyte membrane. In some cases, this causes temporary reduction in the cell voltage at each fuel cell as indicated by the graph VcA.

Figure 18B:
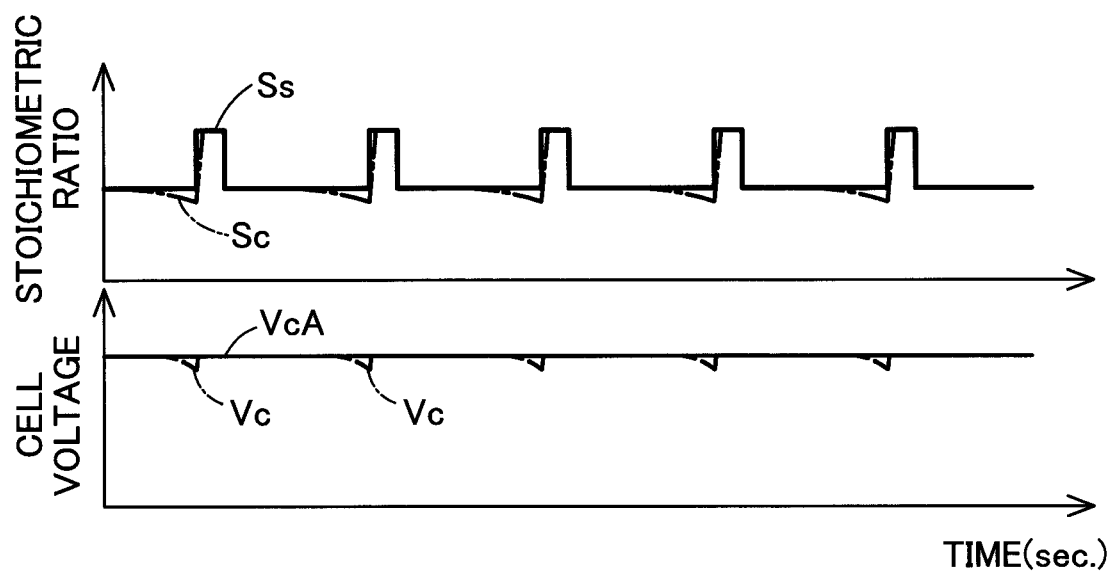
FIG. 18B is an explanatory view showing an example of temporal change in a cell voltage and that of temporal change in the stoichiometric ratio of reactive gas occurring in response to implementation of the monitoring process of the fourth embodiment.

FIG. 18B is an explanatory view similar to FIG. 18A and showing an example of temporal change in a cell voltage and that of temporal change in the stoichiometric ratio of the reactive gas on the same temporal axis resulting from implementation of the monitoring process of the fourth embodiment. The monitoring process of the fourth embodiment makes a determination using the water content estimated value Wc highly sensitive to change in the stoichiometric ratio of the reactive gas. This makes it possible to detect a distribution failure of the reactive gas with high accuracy at an early stage before the occurrence of remarkable reduction in the cell voltage Vc. Capable of detecting the distribution failure of the reactive gas an early stage makes it possible to shorten a period of time in which the stoichiometric ratio of the reactive gas is increased for overcoming the distribution failure of the reactive gas, compared to the case of the comparative example. By doing so, the occurrence of drying of an electrolyte membrane is reduced to be caused by temporarily increasing the stoichiometric ratio of the reactive gas.

As described above, the monitoring device 10 that performs the monitoring process of the fourth embodiment allows detection of a distribution failure of the reactive at the fuel cell 21 at an early stage with high accuracy using the water content estimated value Wc to fluctuate highly sensitively in response to change in the stoichiometric ratio of the reactive gas. Further, the fuel cell monitoring device 10 of the fourth embodiment, the fuel cell system 100 including the fuel cell monitoring device 10, and a method of determining the state of the fuel cell 21 implemented in the fuel cell monitoring device 10 and the fuel cell system 100 achieve various types of functions and effects comparable to those described in each of the foregoing embodiments.

5. Fifth Embodiment

Figure 19:
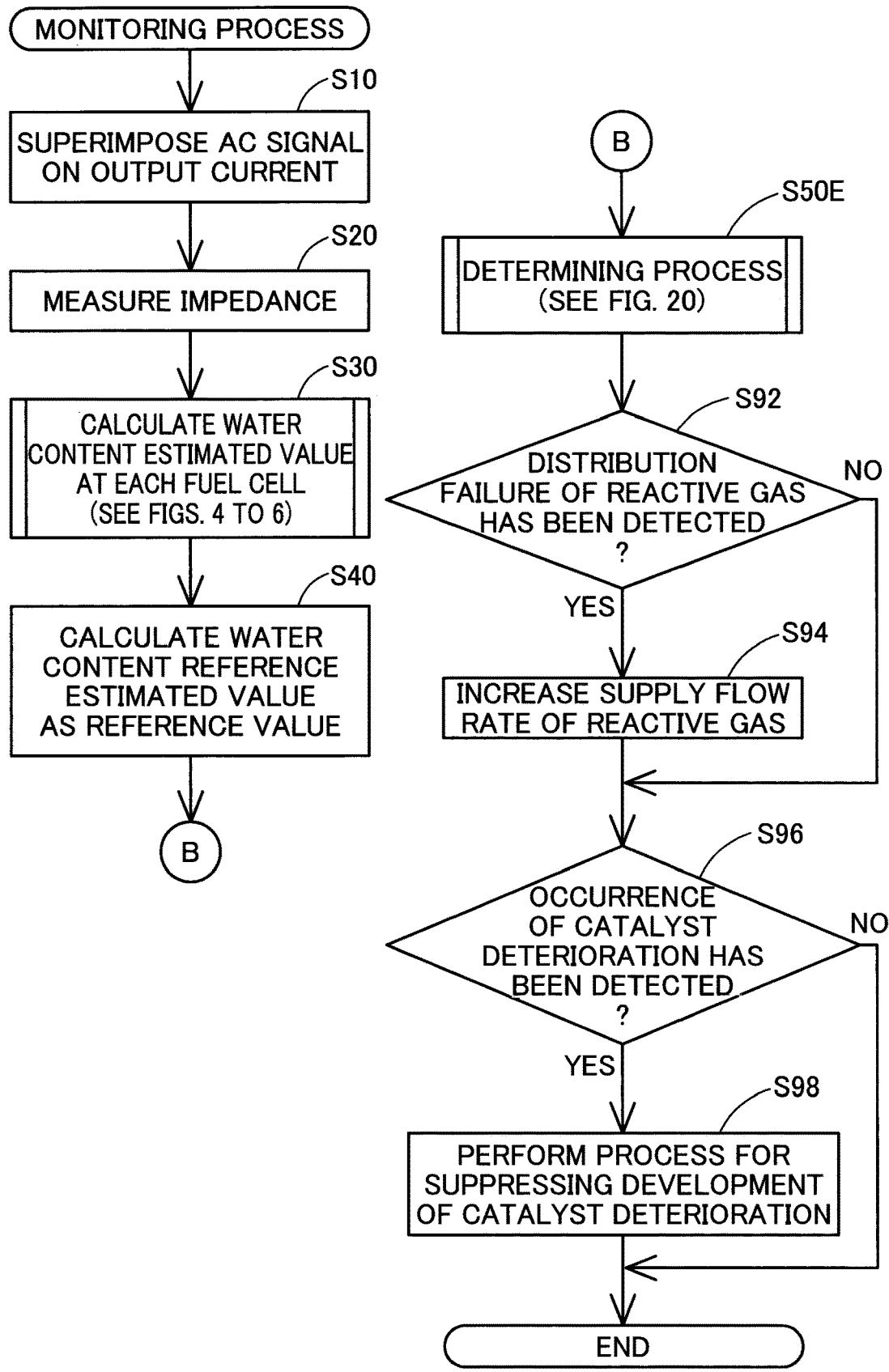
FIG. 19 is an explanatory view showing a flow of monitoring process of a fifth embodiment.

FIG. 19 is an explanatory view showing a flow of monitoring process of a fifth embodiment. The monitoring process of the fifth embodiment is performed by the fuel cell monitoring device 10 having the similar configuration as that described in the first embodiment. The fuel cell monitoring device 10 is mounted on the fuel cell system 100 having the similar configuration as that described in the first embodiment. The fuel cell monitoring device 10 performs the monitoring process in a predetermined cycle while the fuel cell stack 20 generates power. The monitoring process of the fifth embodiment is to detect the occurrence of a failure at the fuel cell 21 using the water content estimated value Wc and the water content reference estimated value Ws acquired in the processes from step S10 to step S40 described in the first embodiment. Further, it is determined whether a factor for the occurrence of the detected failure is either catalyst deterioration or a distribution failure of the reactive gas.

All the fuel cells 21 forming the fuel cell stack 20 are to be targets of determination by the monitoring process of the fifth embodiment. In other embodiments, only some of the fuel cells 21 forming the fuel cell stack 20 may be selected in advance as determination targets. If only some of the fuel cells 21 are to be determination targets, these determination targets desirably include at least a fuel cell 21 at an end of the fuel cell stack 20 viewed in the stacking direction, as described in the first embodiment and the fourth embodiment. In the monitoring process of the fifth embodiment, the water content estimated value Wc and the water content reference estimated value Ws are acquired in steps from S10 to S40 in the same way as that described in the first embodiment. Then, determining process in step S50E is performed.

Figure 20:
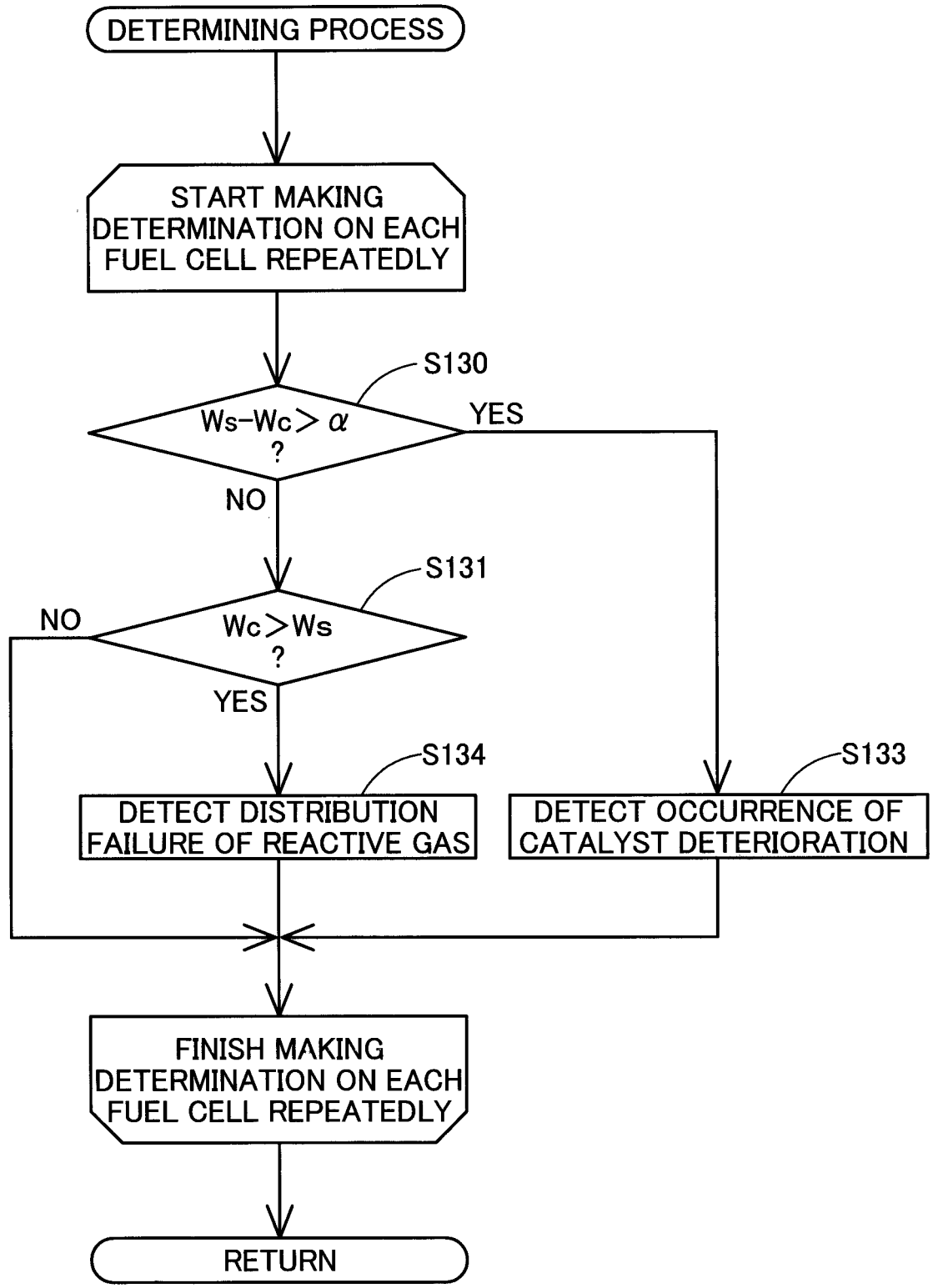
FIG. 20 is an explanatory view showing a flow of determining process of the fifth embodiment.

FIG. 20 is an explanatory view showing a flow of determining process of the fifth embodiment performed in step S50E by the determining part 11*j*. The determining part 11*j* performs the processes steps from S130 to S134 repeatedly on each fuel cell 21 as a determination target to determine the presence or absence of catalyst deterioration and a distribution failure of the reactive gas at all the fuel cells 21 as determination targets.

In step S130, like in the process in step S101 described in the first embodiment, the determining part 11*j* determines using the threshold α whether the water content estimated value Wc at a fuel cell 21 as a determination target has reduced from the reference value Ws of the water content estimated value Wc to an extent exceeding a permissible range. If the relationship of Ws−Wc>α is satisfied, the determining part 11*j* determines in step S133 that catalyst deterioration has occurred at the fuel cell 21 as the current determination target. The determining part 11*j* sets a flag indicating detection of the occurrence of the catalyst deterioration in association with an identifier for identifying the fuel cell 21 as the current determination target.

If the relationship of Ws−Wc>α is determined not to be satisfied in step S130, the determining part 11*j* determines in step S131 whether the water content estimated value Wc at the fuel cell 21 as the determination target is larger than the water content reference estimated value Ws, like in the process in step S121 described in the fourth embodiment. If Wc>Ws is satisfied, the determining part 11*j* detects the occurrence of a distribution failure of the reactive gas at the fuel cell 21 as the current determination target in step S134. The determining part 11*j* sets a flag indicating detection of the occurrence of the distribution failure of the reactive gas in association with an identifier for identifying the fuel cell 21 as the current determination target. If Wc>Ws is not satisfied in step S131, the determining part 11*j* determines that there is no catalyst deterioration and there is no distribution failure of the reactive gas at the fuel cell 21 as the current determination target, and finishes the determination on the fuel cell 21 as the current determination target.

Referring to FIG. 19, in step S92, the monitoring device controller 11 checks the flag set in the determining process in step S50E to determine the presence or absence of a fuel cell 21 as a determination target at which the occurrence of a distribution failure of the reactive gas has been detected. If there is a fuel cell 21 at which the occurrence of a distribution failure of the reactive gas has been detected, the monitoring device controller 11 performs process of temporarily increasing the supply flow rate of the reactive gas in step S94 for overcoming the distribution failure of the reactive gas.

In step S96, the monitoring device controller 11 determines the presence or absence of a fuel cell 21 as a determination target at which the occurrence of catalyst deterioration has been detected in the determining process in step S50E. If there is no fuel cell 21 at which the occurrence of catalyst deterioration has been detected, the monitoring device controller 11 finishes the monitoring process without proceeding further. If there is a fuel cell 21 at which the occurrence of catalyst deterioration has been detected, the monitoring device controller 11 performs process for suppressing development of the catalyst deterioration in step S98. For example, the monitoring device controller 11 requests the system controller 25 to increase supply of the fuel gas more than usual. If catalyst deterioration has been detected in fuel cells 21 of a larger number than a predetermined number, the monitoring device controller 11 requests the system controller 25 to stop power generation by the fuel cell stack 20.

After implementation of the foregoing steps, the monitoring device controller 11 finishes the monitoring process. If either the occurrence of catalyst deterioration or that of a distribution failure of the reactive gas has been detected, the monitoring device controller 11 may perform process of notifying a user of an identifier for identifying a fuel cell 21 at which the detected failure has occurred and the type of the failure.

The monitoring device 10 that performs the monitoring process of the fifth embodiment identifies the occurrence of catalyst deterioration or a distribution failure of the reactive gas at the fuel cell 21 using the water content estimated value Wc obtained from a measurement result about an impedance. This makes it possible to perform appropriate handling process responsive to the detected factor for the failure. Further, according to the fuel cell monitoring device 10 of the fifth embodiment, the fuel cell system 100 including the fuel cell monitoring device 10, and a method of determining the state of the fuel cell 21 implemented in the fuel cell monitoring device 10 and the fuel cell system 100, various functions and effects comparable to those described in each of the foregoing embodiments are achieved.

6. Sixth Embodiment

Figure 21:
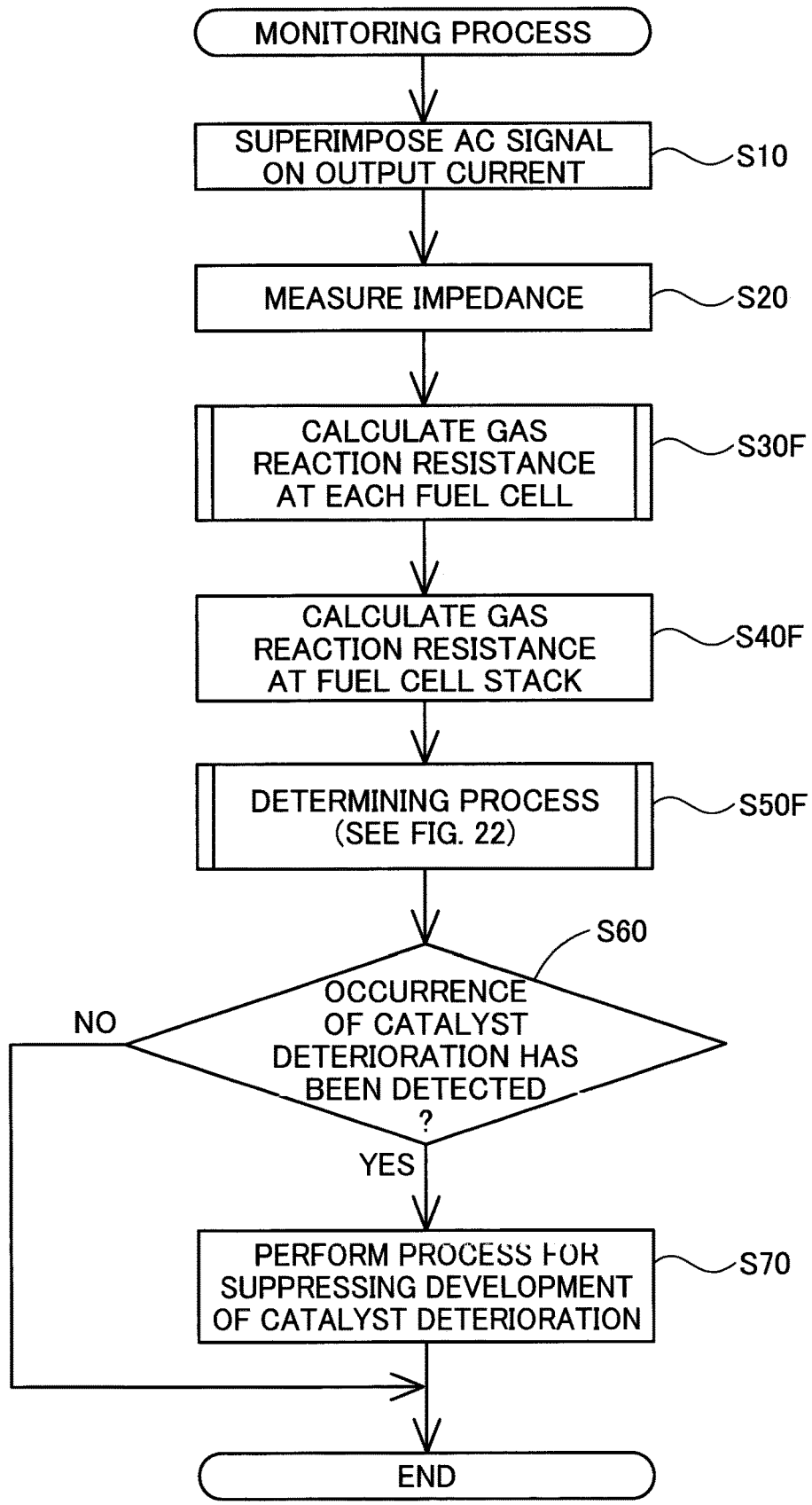
FIG. 21 is an explanatory view showing a flow of monitoring process of a sixth embodiment.

FIG. 21 is an explanatory view showing a flow of monitoring process of a sixth embodiment. The monitoring process of the sixth embodiment is performed by the fuel cell monitoring device 10 having the similar configuration as that described in the first embodiment. The fuel cell monitoring device 10 is mounted on the fuel cell system 100 having the similar configuration as that described in the first embodiment. In the fuel cell monitoring device 10 of the sixth embodiment, the monitoring device controller 11 is not required to include the water content estimating part 11w but is only required to have the function of calculating the gas reaction resistance $R_{ct}$ from a measured impedance value.

The monitoring process of the sixth embodiment is substantially the same as the monitoring process of the first embodiment except that processes in step S30F, step S40F, and step S50F are performed instead of steps S30, S40, and S50A. The monitoring process of the sixth embodiment differs from the monitoring process of the first embodiment in that the presence or absence of catalyst deterioration at the fuel cell 21 is determined using the gas reaction resistance $R_{ct}$ obtained from a measurement result about an impedance.

In step S30F, the monitoring device controller 11 follows the same method as that of the process in step S31 in FIG. 4 to calculate the gas reaction resistance $R_{ct}$ at each fuel cell 21 using a measured impedance value at each fuel cell 21 acquired in steps S10 and S20. In step S40F, the monitoring device controller 11 calculates the gas reaction resistance $R_{ct}A$ at the fuel cell stack 20 using a measured impedance value at the fuel cell stack 20 as a whole acquired in steps S10 and S20. The gas reaction resistance $R_{ct}A$ is a value at each fuel cell 21 and corresponds to a value obtained by dividing a gas reaction resistance at the fuel cell stack 20 as a whole by the number of the fuel cells 21.

Figure 22:
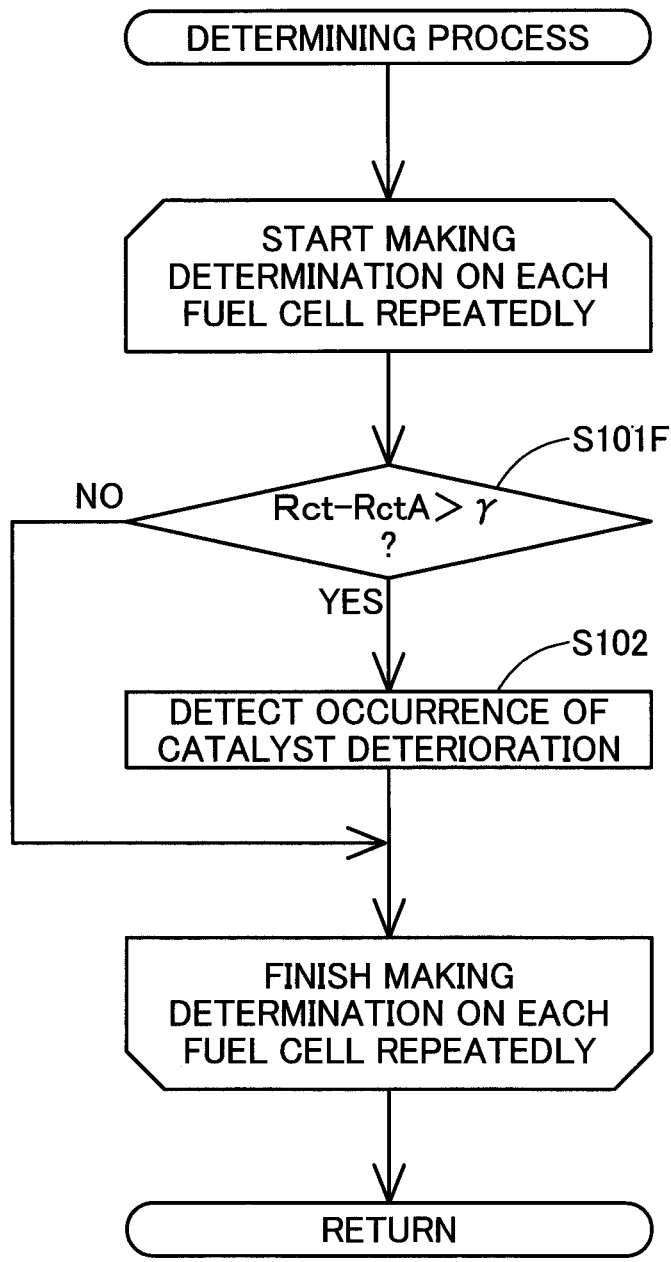
FIG. 22 is an explanatory view showing a flow of determining process of the sixth embodiment.

FIG. 22 is an explanatory view showing a flow of determining process of the sixth embodiment performed in step S50F by the determining part 11j. The determining process of the sixth embodiment is substantially the same as the determining process described in the first embodiment except that a determination is made in step S101F using the gas reaction resistances $R_{ct}$ and $R_{ct}A$ instead of a determination in step S101. In the sixth embodiment, the determining part 11j determines whether the gas reaction resistance $R_{ct}$ at a fuel cell 21 as a determination target has reduced from the gas reaction resistance $R_{ct}A$ as a reference value at the fuel cell stack 20 as a whole to an extent exceeding a permissible range. More specifically, the determining part 11j determines whether a value, obtained by subtracting the gas reaction resistance $R_{ct}A$ at the fuel cell stack 20 as a whole from the gas reaction resistance $R_{ct}$ at the fuel cell 21 as the determination target, is larger than a threshold γ predetermined as the permissible range. If the relationship of $R_{ct}-R_{ct}A>\gamma$ is satisfied, the determining part 11j detects the occurrence of catalyst deterioration at the fuel cell 21 as the current determination target in step S102. If the relationship of $R_{ct}-R_{ct}A>\gamma$ is not satisfied, the determining part 11j finishes the determination on the fuel cell 21 as the current determination target.

The gas reaction resistance $R_{ct}$ is a parameter indicating difficulty in producing electrochemical reaction caused by catalyst. Thus, the determining process in step S50F using the gas reaction resistance $R_{ct}$ allows detection of the occurrence of catalyst deterioration with high accuracy. Further, even if the catalyst as a whole in the fuel cell stack 20 changes with aging, using the gas reaction resistance $R_{ct}A$ as a reference value at the fuel cell stack 20 as a whole still makes it possible to detect performance reduction with high accuracy caused by catalyst deterioration occurring at some of the fuel cells 21.

As described above, the monitoring device 10 that performs the monitoring process of the sixth embodiment allows detection of the occurrence of catalyst deterioration at the fuel cell 21 with high accuracy using the gas reaction resistance $R_{ct}$ without the need of obtaining the water content estimated value from a measured impedance value. Further, according to the fuel cell system 100 including the fuel cell monitoring device 10 of the sixth embodiment, development of catalyst deterioration is suppressed appropriately to allow reduction in the occurrence of a defect due to development of the catalyst deterioration.

7. Other Embodiments

The following gives examples of possible changes to the various types of configurations described in each of the foregoing embodiments. Like each of the foregoing embodiments, all the embodiments described below are regarded as exemplary embodiments for carrying out the technique of this disclosure.

Other Embodiments 1

In each of the foregoing embodiments, the water content reference estimated value Ws used for detecting the occurrence of catalyst deterioration is derived from a measurement result about an impedance at the fuel cell stack 20 as a whole. Meanwhile, a value other than the water content reference estimated value Ws may be used as a reference value with which the magnitude of the water content estimated value Wc used for detecting the occurrence of catalyst deterioration is determined. This reference value may be a value to fluctuate in response to a current water content in the fuel cell stack 20 as a whole. For example, an average of the water content estimated values Wc at corresponding fuel cells 21 as determination targets may be used as it is as the reference value. Alternatively, the reference value may be a water content estimated value at each fuel cell 21 calculated from the amount of power generated by the fuel cell stack 20, supply of the reactive gas, and the amount of drainage.

Other Embodiments 2

In the determining process of the third embodiment shown in FIG. 13, a determination in step S110 based on a negative potential may be omitted. In this case, like in the determining process of the first embodiment, only the occurrence of catalyst deterioration may be detected at a fuel cell 21 as a determination target.

8. Others

In the foregoing embodiments, some or all of the functions and processes realized by software may be realized by hardware. Further, some or all of the functions and processes realized by hardware may be realized by software. Various types of circuits are usable as the hardware such as an integrated circuit, a discrete circuit, and a circuit module using the integrated circuit and the discrete circuit in combination.

The technique of this disclosure is not limited to the above-described embodiments, examples, or modifications but is feasible in the form of various configurations within a range not deviating from the substance of this disclosure. For example, technical features in the embodiments, those in the examples, or those in the modifications corresponding to those in each of the aspects described in SUMMARY may be replaced or combined, where appropriate, with the intention of solving some or all of the foregoing problems or achieving some or all of the foregoing effects. Technical features that may be deleted in appropriate cases include not only those described as not being absolute necessities in this specification but also those not described as being absolute necessities in this specification. The present disclosure may be implemented by aspects described below.

A first aspect is provided as a fuel cell monitoring device that monitors the state of a fuel cell stack including multiple stacked fuel cells. The fuel cell monitoring device of this aspect includes: an impedance measuring part configured to apply an AC signal to the fuel cell stack, detect a voltage at each of the fuel cells, a voltage at the fuel cell stack as a whole and an output current from the fuel cell stack, and measure an impedance at each of the fuel cells and an impedance at the fuel cell stack as a whole; a water content estimating part configured to obtain a gas diffusion resistance at each of the fuel cells having a correlation with a water content in each of the fuel cells using a measurement result about the impedance at each of the fuel cells, calculate a water content estimated value as an estimated value of a water content in each of the fuel cells using the gas diffusion resistance at each of the fuel cells, obtain a gas diffusion resistance at the fuel cell stack having a correlation with a water content in the fuel cell stack using a measurement result about the impedance at the fuel cell stack as a whole, and calculate a water content reference estimated value indicating a water content in each of the fuel cells using the gas diffusion resistance at the fuel cell stack; and a determining part configured to detect at least either the occurrence of deterioration of catalyst in the fuel cells or the occurrence of a distribution failure of reactive gas at the fuel cells by determining based on the magnitude of the water content estimated value relative to the water content reference estimated value.

According to the fuel cell monitoring device of this aspect, a water content estimated value and a water content reference estimated value are derived using a gas diffusion resistance calculated from a measurement result about an impedance and having a high correlation with a water content in the fuel cells or the fuel cell stack. The water content estimated value has such characteristics as to change in magnitude relative to the water content reference estimated value in response to catalyst deterioration or a distribution failure of the reactive gas at the fuel cells. The fuel cell monitoring device of this aspect uses such characteristics of the water content estimated value as a basis to identify at least either catalyst deterioration or a distribution failure of the reactive gas at the fuel cells as a factor for a defect occurring at the fuel cell, thereby achieving detection of the occurrence of the defect correctly. The water content reference estimated value changes in response to the current state of the fuel cell stack as a whole such as change in the fuel cell stack as a whole with aging, for example. The fuel cell monitoring device of this aspect uses such a reference value to change in response to the current state of the fuel cell stack as a whole for making a determination on the state of the fuel cells. This makes it possible to suppress fluctuations of determination accuracy to be caused by change in the state of the fuel cell stack as a whole.

In the fuel cell monitoring device of the foregoing aspect, the determining part may determine that the catalyst deterioration has occurred at the fuel cells as a determination target when a determination condition including a provision that the water content estimated value has reduced from the water content reference estimated value to an extent exceeding a predetermined permissible range is satisfied.

According to the fuel cell monitoring device of this aspect, the occurrence of catalyst deterioration at the fuel cells is to be detected correctly.

In the fuel cell monitoring device of the foregoing aspect, the determining part may determine that the catalyst deterioration has occurred at the fuel cell as the determination target when the determination condition including a provision that a negative voltage has been detected and the provision that the water content estimated value has reduced from the water content reference estimated value to an extent exceeding the permissible range is satisfied.

According to the fuel cell monitoring device of this aspect, a voltage is used as a determination condition additionally, so the occurrence of catalyst deterioration at the fuel cells is to be detected with a higher degree of accuracy.

In the fuel cell monitoring device of the foregoing aspect, the determining part may determine that a supply failure of the reactive gas has occurred at the fuel cell as a determination target when the water content estimated value is detected to be larger than the water content reference estimated value.

According to the fuel cell monitoring device of this aspect, the occurrence of a supply failure of the reactive gas at the fuel cells is to be detected correctly.

A second aspect is provided as a fuel cell monitoring device that monitors the state of a fuel cell stack including multiple stacked fuel cells. The fuel cell monitoring device of this aspect includes: an impedance measuring part configured to apply an AC signal to the fuel cell stack, detect a voltage at each of the fuel cells and an output current from the fuel cell stack, and measure an impedance at each of the fuel cells; a water content estimating part configured to obtain a gas diffusion resistance at each of the fuel cells having a correlation with a water content in each of the fuel cells using a measurement result about the impedance at each of the fuel cells, and calculate a water content estimated value as an estimated value of a water content in each of the fuel cells using the gas diffusion resistance at each of the fuel cells; and a determining part configured to detect the occurrence of deterioration of catalyst in the fuel cells by determining based on the magnitude of the water content estimated value relative to a reference value to fluctuate in response to a current water content in the fuel cell stack as a whole.

According to the fuel cell monitoring device of this aspect, the characteristics of the water content estimated value calculated using the gas diffusion resistance derived from the measurement result about the impedance is used, so the occurrence of catalyst deterioration is to be detected correctly. The reference value used for determining catalyst deterioration is to change in response to current power generating performance of the fuel cell stack as a whole determined by change in the fuel cell stack as a whole with aging, for example. Therefore, it makes possible to correctly detect a fuel cell among the fuel cells at which catalyst deterioration develops particularly seriously.

A third aspect is provided as a fuel cell monitoring device that monitors the state of a fuel cell stack including multiple stacked fuel cells. The fuel cell monitoring device of this aspect includes: an impedance measuring part configured to apply an AC signal to the fuel cell stack, and measure an impedance at each of the fuel cells; a water content estimating part configured to obtain a gas diffusion resistance having a correlation with a water content in each of the fuel cells using a measurement result about the impedance at each of the fuel cells, and calculate a water content estimated value as an estimated value of a water content in each of the fuel cells using the gas diffusion resistance; and a determining part configured to detect the occurrence of deterioration of catalyst in the fuel cells by following predetermined order at the multiple fuel cells as determination targets.

The determining part uses the water content estimated value at the fuel cell as a reference value having been determined previously and at which deterioration of the catalyst has not been detected. The occurrence of deterioration of the catalyst at the fuel cell as a current determination target is determined, when a determination condition including a provision that the water content estimated value at the fuel cell as the current determination target has reduced from the reference value to an extent exceeding a predetermined permissible range is satisfied.

According to the fuel cell monitoring device of this aspect, a determination is to be done using the water content estimated value on a different fuel cell determined to be free from the occurrence of catalyst deterioration as a reference value. This allows the current and normal tendency of the water content estimated value at the fuel cell stack as a whole to be reflected in a determination result, making it possible to suppress fluctuations of determination accuracy to be caused by change in the state of the fuel cell stack as a whole.

The technique of this disclosure is feasible in various aspects other than the fuel cell monitoring device. For example, the technique of this disclosure is feasible as a method of determining the state of a fuel cell stack, a method of detecting catalyst deterioration at a fuel cell, a method of detecting a distribution failure of reactive gas at a fuel cell stack, a method of controlling a fuel cell monitoring device and a controller for the fuel cell monitoring device, a fuel cell system including a fuel cell monitoring device and a method of controlling the fuel cell system, a computer program to realize any of the foregoing methods, a non-transitory recording medium storing the computer program, and the like.

What is claimed is:

1. A fuel cell monitoring device monitoring the state of a fuel cell stack including multiple stacked fuel cells, the fuel cell monitoring device comprising a monitoring device controller: wherein
the monitoring device controller is programmed to apply an AC signal to the fuel cell stack, detect a voltage at each of the fuel cells, a voltage at the fuel cell stack as a whole and an output current from the fuel cell stack, and measure an impedance at each of the fuel cells and an impedance at the fuel cell stack as a whole;
obtain a gas diffusion resistance at each of the fuel cells having a correlation with a water content in each of the fuel cells using a measurement result about the impedance at each of the fuel cells, calculate a water content estimated value as an estimated value of a water content in each of the fuel cells using the gas diffusion resistance at each of the fuel cells, obtain a gas diffusion resistance at the fuel cell stack having a correlation with a water content in the fuel cell stack using a measurement result about the impedance at the fuel cell stack as a whole, and calculate a water content reference estimated value indicating a water content in each of the fuel cells using the gas diffusion resistance at the fuel cell stack; and
detect at least either the occurrence of deterioration of catalyst in the fuel cells or the occurrence of a distribution failure of reactive gas at the fuel cells by determining based on the magnitude of the water content estimated value relative to the water content reference estimated value.

2. The fuel cell monitoring device according to claim 1, wherein the monitoring device controller is further programmed to that the catalyst deterioration has occurred at the fuel cell as a determination target when a determination condition including a provision that the water content estimated value has reduced from the water content reference estimated value to an extent exceeding a predetermined permissible range is satisfied.

3. The fuel cell monitoring device according to claim 2, wherein
the monitoring device controller is further programmed to determine that the catalyst deterioration has occurred at the fuel cell as the determination target when the determination condition including a provision that a negative voltage has been detected and the provision that the water content estimated value has reduced from the water content reference estimated value to an extent exceeding the permissible range is satisfied.

4. The fuel cell monitoring device according to claim 1, wherein
the monitoring device controller is further programmed to determine that a supply failure of the reactive gas has occurred at the fuel cell as a determination target when the water content estimated value is detected to be larger than the water content reference estimated value.

5. A fuel cell monitoring device monitoring the state of a fuel cell stack including multiple stacked fuel cells, the fuel cell monitoring device comprising a monitoring device controller: wherein
the monitoring device controller is programmed to apply an AC signal to the fuel cell stack, detect a voltage at each of the fuel cells and an output current from the fuel cell stack, and measure an impedance at each of the fuel cells;
obtain a gas diffusion resistance at each of the fuel cells having a correlation with a water content in each of the fuel cells using a measurement result about the impedance at each of the fuel cells, and calculate a water content estimated value as an estimated value of a water content in each of the fuel cells using the gas diffusion resistance at each of the fuel cells; and
detect the occurrence of deterioration of catalyst in the fuel cells by determining based on the magnitude of the water content estimated value relative to a reference value to fluctuate in response to a current water content in the fuel cell stack as a whole.

6. A fuel cell monitoring device monitoring the state of a fuel cell stack including multiple stacked fuel cells, the fuel cell monitoring device comprising a monitoring device controller: wherein
the monitoring device controller is programmed to apply an AC signal to the fuel cell stack, and measure an impedance at each of the fuel cells;
obtain a gas diffusion resistance having a correlation with a water content in each of the fuel cells using a measurement result about the impedance at each of the fuel cells, and calculate a water content estimated value as an estimated value of a water content in each of the fuel cells using the gas diffusion resistance; and
detect the occurrence of deterioration of catalyst in the fuel cells by following predetermined order at the multiple fuel cells as determination targets, wherein
the monitoring device controller is further programmed to use the water content estimated value at the fuel cell as a reference value having been determined previously and at which deterioration of the catalyst has not been detected, and the occurrence of deterioration of the catalyst at the fuel cell as a current determination target is determined by the monitoring device controller, when a determination condition including a provision that the water content estimated value at the fuel cell as the current determination target has reduced from the reference value to an extent exceeding a predetermined permissible range is satisfied.

7. A method of determining the state of a fuel cell stack including multiple stacked fuel cells, comprising:

programming a monitoring device controller to;

apply an AC signal to the fuel cell stack while the fuel cell stack generates power, detect a voltage at each of the fuel cells and an output current from the fuel cell stack, and measure an impedance at each of the fuel cells and an impedance at the fuel cell stack as a whole;

obtain a gas diffusion resistance at each of the fuel cells having a correlation with a water content in each of the fuel cells using a measurement result about the impedance at each of the fuel cells, and calculate a water content estimated value as an estimated value of a water content in each of the fuel cells using the gas diffusion resistance at each of the fuel cells;

obtain a gas diffusion resistance at the fuel cell stack having a correlation with a water content in the fuel cell stack using a measurement result about the impedance at the fuel cell stack as a whole, and calculate a water content reference estimated value as an estimated value of a water content in each of the fuel cells using the gas diffusion resistance at the fuel cell stack; and detect at least either the occurrence of deterioration of catalyst in the fuel cells or the occurrence of a distribution failure of reactive gas at the fuel cells by determining the magnitude of the water content estimated value relative to the water content reference estimated value.

\* \* \* \* \*